US012182757B2

(12) United States Patent
Cardenas et al.

(10) Patent No.: US 12,182,757 B2
(45) Date of Patent: *Dec. 31, 2024

(54) AUTOMATED INSPECTION OF CLOSED PACKAGE CONTENTS AND SCANNING TO OPTICALLY COUPLED SYSTEMS

(71) Applicant: Vicente Cardenas, Laredo, TX (US)

(72) Inventors: Vicente Cardenas, Laredo, TX (US); Raul Trevino, Laredo, TX (US)

(73) Assignee: Vicente Cardenas, Laredo, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,695

(22) Filed: Sep. 29, 2023

(65) Prior Publication Data

US 2024/0029009 A1    Jan. 25, 2024

Related U.S. Application Data

(63) Continuation of application No. 17/646,276, filed on Dec. 28, 2021, now Pat. No. 11,810,054.

(51) Int. Cl.
*G06Q 10/08*    (2024.01)
*G06Q 10/083*    (2023.01)
(Continued)

(52) U.S. Cl.
CPC ..... *G06Q 10/0833* (2013.01); *G06Q 10/0832* (2013.01); *G06Q 10/0838* (2013.01); *G06T 7/0002* (2013.01)

(58) Field of Classification Search
CPC ............... G06Q 10/08; G06Q 10/0832; G06Q 10/0833; G06Q 10/0838
See application file for complete search history.

(56) References Cited

U.S. PATENT DOCUMENTS 7,312,702 B1 * 12/2007 Willms .................. G06Q 50/40
705/333
7,606,741 B2   10/2009 King et al.
(Continued)

FOREIGN PATENT DOCUMENTS

WO      2021092263 A1    5/2021

OTHER PUBLICATIONS

Chen, Hao, et al. "The use of machine learning to identify the correctness of HS Code for the customs import declarations." 2021 IEEE 8th International Conference on Data Science and Advanced Analytics (DSAA). IEEE, 2021. (Year: 2021).*

(Continued)

*Primary Examiner* — Scott M Tungate
(74) *Attorney, Agent, or Firm* — Thompson Patent Law Offices PC

(57) ABSTRACT

Apparatus and associated methods relate to automatically generating a jurisdiction entry compliance indicator (JECI) based on an automatically generated content attributes profile (CAP) for a closed package. In an illustrative example, the CAP may be generated based on predetermined content attributes selected by a content characterization model as a function of a contents description profile (CDP) for the package. The CDP may, for example, be automatically generated by a natural language processing model as a function of a predetermined text description of contents of the package. The JECI may be generated as a function of the CAP, predetermined permissions rules, and predetermined permissions attributes. The predetermined permissions attributes may be associated with the originator. The predetermined permissions rules may be identified by a rules identification model as a function of the CAP and a destination of the package. Various embodiments may advantageously automatically inspect contents of closed packages.

26 Claims, 11 Drawing Sheets

(51) Int. Cl.
*G06Q 10/0832* (2023.01)
*G06Q 10/0833* (2023.01)
*G06T 7/00* (2017.01)

(56) References Cited

U.S. PATENT DOCUMENTS

| | | | |
|---|---|---|---|
| 8,732,093 B2 | 5/2014 | Mack | |
| 10,185,670 B2 | 1/2019 | Litichever et al. | |
| 10,353,837 B2 | 7/2019 | Sengoku et al. | |
| 11,238,542 B1* | 2/2022 | Wixted | G06Q 30/0633 |
| 2005/0222853 A1 | 10/2005 | Black et al. | |
| 2010/0262512 A1* | 10/2010 | Lee | G06Q 30/0601 |
| | | | 715/764 |
| 2011/0066549 A1 | 3/2011 | Whitehouse | |
| 2017/0091320 A1 | 3/2017 | Psota et al. | |
| 2017/0132489 A1* | 5/2017 | Simgi | G06Q 50/60 |
| 2017/0316293 A1 | 11/2017 | Morimoto | |
| 2018/0094953 A1 | 4/2018 | Colson et al. | |
| 2018/0211214 A1* | 7/2018 | Gadaev | G06Q 10/08 |
| 2019/0156283 A1 | 5/2019 | Abebe et al. | |
| 2021/0049548 A1* | 2/2021 | Grisz | G06F 8/38 |

OTHER PUBLICATIONS

Chen, et al, "The use of machine learning to identify the correctness of HS Code for the customs import declarations," 2021 IEEE 8th International Conference on Data Science and Advanced Analytics (DSAA), 2021, pp. 1-8 (Year: 2021).

Donges, et al., "A single USB barcode scanner connected to 2 devices simuntaneously?," TheSpiceworks Community, Apr. 5, 2016, Accessed Dec. 2, 2021, . https://community.spiceworks.com/topic/1540444-a-single-usbbarcode-scanner-connected-to-2-devices-simuntaneously.

F. A. Bukhsh and H. Weigand, "Compliance Checking of Shipment Request by Utilizing Process Mining Concepts: An Evaluation of Smart Auditing Framework." 2017 International Conference on Frontiers of Information Technology (FIT), Islamabad, Pakistan, 2017, pp. 235-240, doi: 10.1109/FIT.2017.00049. (Year: 2017).

Infofort, "Customs Documentation Automation Solution," Brochure, Accessed: Aug. 10, 2021, https://www.infofort.com/Uploads/docs/InfoFort_Customs_Documentation_Automation.pdf.

International Search Report and Written Opinion of the International Searching Authority in related International Application No. PCT/US2021/073144, dated May 11, 2022, 2022, 14 pages.

SPICEHEAD-05j44, et al., "Can we get the barcode scanner output to two applications at the same time?." The Spiceworks Community, Jul. 8, 2019, accessed Dec. 2, 2021, https://community.spiceworks.com/topic/2219937-can-we-get-the-barcode-scanner-output-to-two-applications-at-the-same-time.

Webshipper ApS, "Speed Up Your Shipments With Customs," Webshipper, Accessed Aug. 10, 2021, https://webshipper.com/paperless-customs/.

* cited by examiner

AUTOMATED INSPECTION OF CLOSED PACKAGE CONTENTS AND SCANNING TO OPTICALLY COUPLED SYSTEMS

CROSS-REFERENCE TO RELATED APPLICATIONS

This application is a Continuation of PCT Application Ser. No. PCT/2021/073144 entitled "Automated Inspection of Closed Package Contents and scanning to Optically Coupled Systems," filed by Vicente Cardenas, et al. on Dec. 28, 2021.

This application is a Continuation of U.S. patent application Ser. No. 17/646,276 entitled "Automated Inspection of Closed Package Contents and scanning to Optically Coupled Systems," filed by Vicente Cardenas, et al. on Dec. 28, 2021.

This application incorporates the entire contents of the foregoing application herein by reference.

TECHNICAL FIELD

Various embodiments relate generally to processing packages.

BACKGROUND

Packages may be transported through a distribution system. For example, a manufacturer may ship to a distributor. The distributor may ship to one or more other distributors. Packages may be shipped across jurisdictions (e.g., across national borders). Inter-jurisdiction shipments may be required to meet (predetermined) entry requirements. The entry requirements may, for example, be associated with a country of origin and/or characteristics of items being shipped.

Packages may be tracked during shipment. For example, a shipper may track a package to verify the package arrived at an intended location. A customer may track a package to monitor an expected arrival time. A transporter may track a package during transit to accomplish receipt, transit, and delivery as contracted.

SUMMARY

Apparatus and associated methods relate to automatically generating a jurisdiction entry compliance indicator (JECI) based on an automatically generated content attributes profile (CAP) for a closed package. In an illustrative example, the CAP may be generated based on predetermined content attributes selected by a content characterization model as a function of a contents description profile (CDP) for the package. The CDP may, for example, be automatically generated by a natural language processing model as a function of a predetermined text description of contents of the package. The JECI may be generated as a function of the CAP, predetermined permissions rules, and predetermined permissions attributes. The predetermined permissions attributes may be associated with the originator. The predetermined permissions rules may be identified by a rules identification model as a function of the CAP and a destination of the package. Various embodiments may advantageously automatically inspect contents of closed packages.

Various embodiments may achieve one or more advantages. For example, some embodiments may advantageously automatically inspect and/or reject a package without requiring manual opening and/or inspection of the package. Various embodiments may, for example, advantageously provide a solution to problems associated with high labor costs, long processing times, and/or human variability (e.g., forgetting to apply one or more rules) associated with manual inspection. Embodiments may, for example, advantageously provide a technical solution to the technological problem of enabling a computer system to automatically inspect contents of a closed package without opening the package (e.g., based on a text description of contents). Various such embodiments may, for example, advantageously provide a technical solution to the technological problem of enabling a computer system to automatically generate a visual indicia to pass, reject, and/or manually inspect a closed package based on a predetermined description of contents of the package (e.g., from a third party). A number of packages to be physically opened may advantageously be drastically reduced.

Some embodiments may advantageously define content-based requirements for a package to be lawfully permitted to enter a destination jurisdiction. Various embodiments may advantageously provide a technical solution to enabling a computer system to automatically determine, based on contents of a closed package, whether the package can enter a jurisdiction, should be rejected for entry, and/or should be further inspected. Various embodiments may advantageously provide a technical solution to enable computers to communicate automatic content inspection results and/or resulting determined actions (e.g., pass, reject, inspect) to human operators.

Various embodiments may advantageously reduce time spent by humans in generating and/or reviewing forms to a fraction of the time spent manually identifying and filling out information in customs forms Various embodiments may advantageously enable a single scanning operation to be used to provide input to multiple master systems. Embodiments implementing a scanner multiplier system may, by way of example and not limitation, advantageously (optically) connect otherwise isolated (e.g., electronically isolated) data networks and/or systems. Various embodiments may advantageously allow a single scanning device to report to multiple different (e.g., electronically isolated) master systems simultaneously. Such embodiments may advantageously reduce labor in scanning. Such embodiments may advantageously reduce energy expenditure, handling costs, and/or laborer fatigue. Various such embodiments may, for example, advantageously provide a technical solution to a technological problem of simultaneously verifying that a package is scanned to multiple systems with a single scanning operation. Various embodiments may advantageously reduce a cost of equipment by allowing an inexpensive scanner to be used and optically connected to one or more higher cost 'base' scanners.

Various embodiments may, for example, advantageously enable a distributor to avoid duplication of scanning efforts by multiplying a single scanning operation by a 'slave' scanner (scanning device 935) across a master controller 950 of the distributor's system and a master scanning device 965 of the originator's system. Accordingly, the originator may advantageously avoid modifying their network or introducing security vulnerabilities by using a physical scanning device approved by the originator, while still receiving the benefit of reduced costs and reduced processing time achieved by the distributor performing a single scanning operation per package. Such embodiments may, for example, advantageously provide a technical solution to a technological problem of physically scanning a package once when multiple physical scanners must scan the same package. In various embodiments, discrepancies may be advantageously identified and rectified before data is scanned into a verification system.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an automatic package inspection (PI) system is introduced with reference to FIGS. 1-2. Second, that introduction leads into a description with reference to FIGS. 3-4 of some exemplary embodiments of machine learning models used in PI systems. Third, with reference to FIGS. 5-6, exemplary methods of automatic package inspection are discussed. Fourth, with reference to FIGS. 7-8, exemplary methods of training the machine learning models are described. Fifth, with reference to FIGS. 9-10, the discussion turns to an introduction of a scanner multiplier system (SMS). Sixth, this disclosure discusses, with reference to FIG. 11, an exemplary method for an SMS system. Finally, the document discusses further embodiments, exemplary applications and aspects relating to automatic package inspection and/or scanner multiplication.

Figure 1:
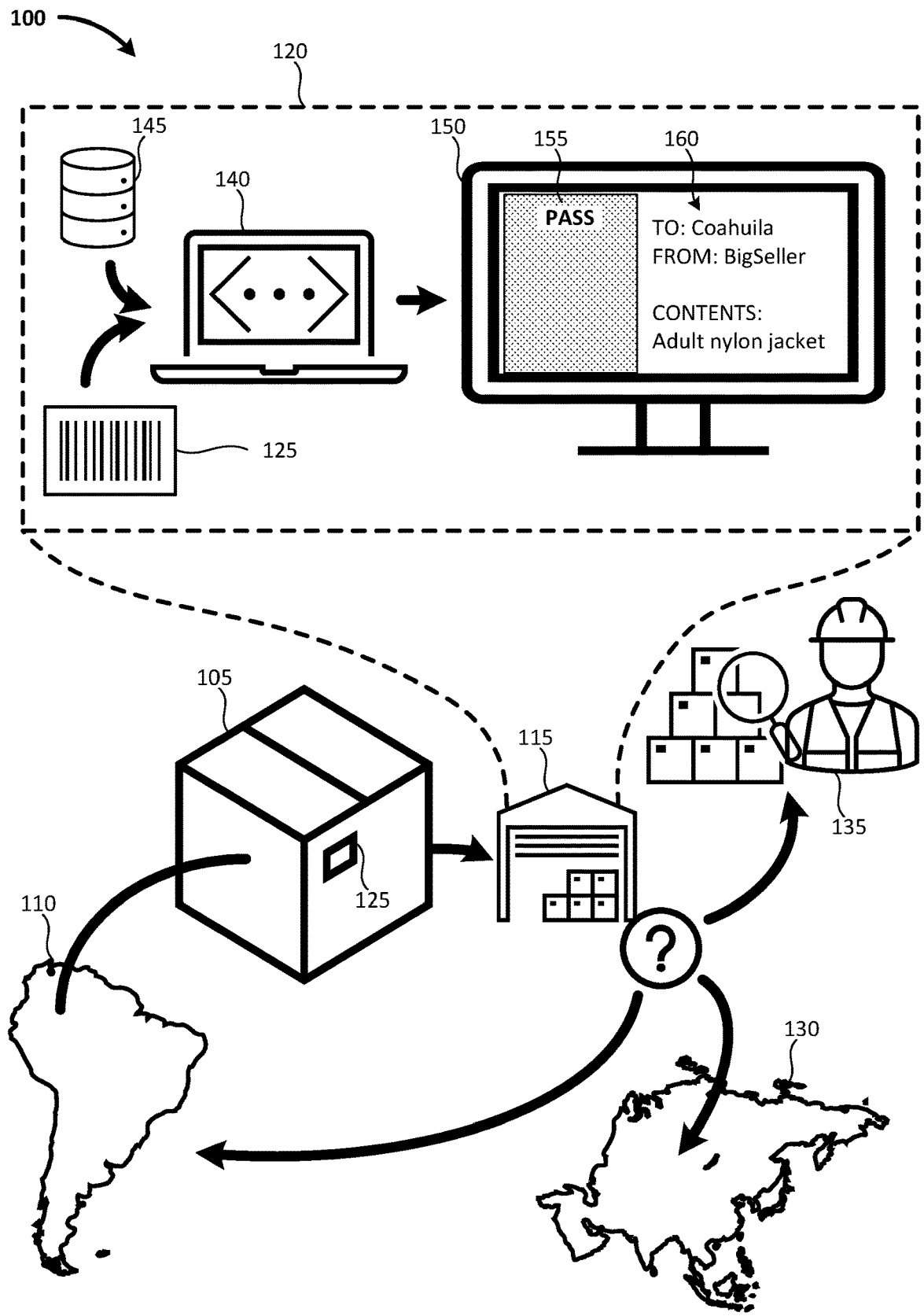
FIG. 1 depicts an exemplary package content inspection system (PCIS) employed in an illustrative use-case scenario.

FIG. 1 depicts an exemplary package content inspection system (PCIS) employed in an illustrative use-case scenario. In an exemplary scenario 100, a package 105 is shipped from an originator in a first jurisdiction 110 to a customs broker 115. The customs broker 115 applies a PCIS 120 to a content description associated with a label 125 identifying the package 105 to determine how to handle the package 105. Based on the output of the PCIS 120, the customs broker 115 may be automatically passed to enter a destination jurisdiction 130 without manual inspection. In some examples, the output of the PCIS 120 may indicate that the package 105 must be returned to the first jurisdiction 110. In some examples, the output of the PCIS 120 may indicate that the package 105 should be opened and the contents reviewed by an inspector 135.

In the depicted example, the PCIS 120 includes an automatic content inspection engine (an ACIE 140). The ACIE 140 receives a (predetermined) description of contents corresponding to the label 125, and receives (e.g., retrieves) predetermined attributes and/or rules from a data store 145. The ACIE 140 applies one or more models (e.g., natural language processing, content characterization, rules identification) based on the description of the contents and generates a jurisdiction entry compliance indicator (JECI). Based on the JECI and predetermined criterion(s), an indication of how to handle the package is generated. The ACIE 140 may, as depicted, be operably coupled to a display 150 to cause a human-readable display indicating how to handle the package to be automatically generated in response to receiving the description of contents. In the depicted example, the display 150 is configured to display a visual indication to pass 155 for the package 105. The display 150 further includes, as depicted, a visual indication 160 of the destination jurisdiction, the originator, and the contents of the package 105. Accordingly, various embodiments may advantageously automatically inspect and/or reject a package without requiring manual opening and/or inspection of the package.

Various embodiments may, for example, advantageously provide a solution to problems associated with high labor costs, long processing times, and/or human variability (e.g., forgetting to apply one or more rules) associated with manual inspection. Embodiments may, for example, advantageously provide a technical solution to the technological problem of enabling a computer system to automatically inspect contents of a closed package without opening the package (e.g., based on a text description of contents). Various such embodiments may, for example, advantageously provide a technical solution to the technological problem of enabling a computer system to automatically generate a visual indicia to pass, reject, and/or manually inspect a closed package based on a predetermined description of contents of the package (e.g., from a third party).

Figure 2:
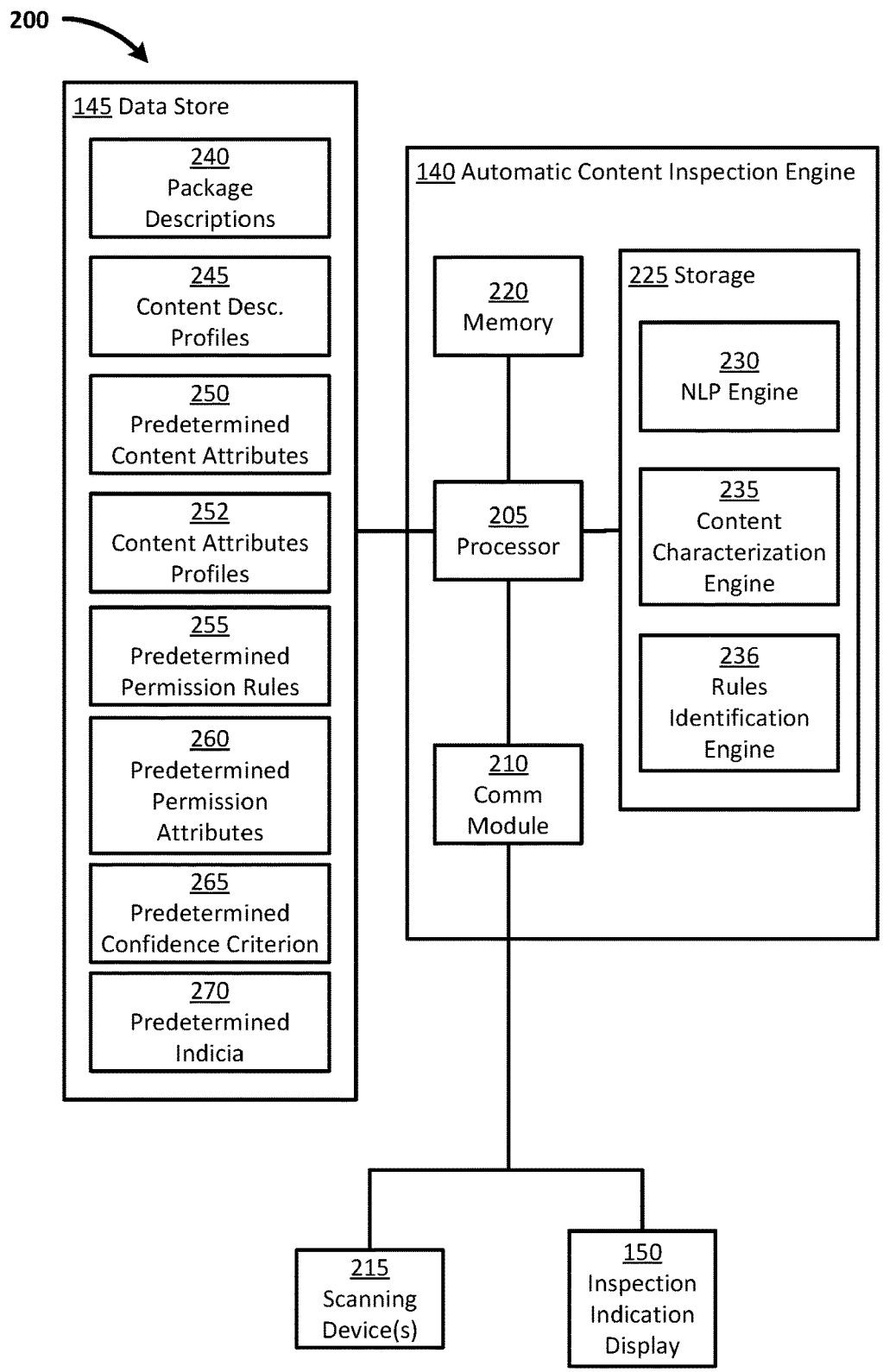
FIG. 2 depicts an exemplary block diagram of the exemplary PCIS.

FIG. 2 depicts an exemplary block diagram of the exemplary PCIS. A PCIS 200 (e.g., such as PCIS 120 disclosed at least with reference to FIG. 1) includes the ACIE 140 and the data store 145. The ACIE 140 includes a processor 205. The processor 205 may, for example, include one or more processor. The processor 205 is operably coupled to a communication module 210. The communication module 210 may, for example, include wired communication. The communication module 210 may, for example, include wireless communication. In the depicted example, the communication module 210 is operably coupled to at least one scanning device 215 (e.g., barcode scanners, smartphones, tablets). In the depicted example, the communication module 210 is operably coupled to at least one display 150 (e.g., an "inspection indication display," as labeled in FIG. 2).

The processor 205 is operably coupled to a memory module 220. The memory module 220 may, for example, include one or more memory modules (e.g., random-access memory (RAM)). The processor 205 includes a storage module 225. The storage module 225 may, for example, include one or more storage modules (e.g., non-volatile memory). In the depicted example, the storage module 225 includes a natural language processing model (an NLP engine 230). The NLP engine 230 may, for example, be applied to an input signal (e.g., text input) to determine a content description in one or more predetermined languages.

The storage module 225 includes a content characterization engine 235. The content characterization engine 235 may, for example, be applied to an output of the NLP engine 230 and/or other data to determine (predetermined) attributes of content associated with a content description.

The storage module 225 includes a rules identification engine 236. The rules identification engine 236 may, for example, be applied to an output of the content characterization engine 235 and/or other data to determine (predetermined) permissions rules associated with a content description, a destination jurisdiction, an originator, or some combination thereof.

In some embodiments the NLP engine 230, the content characterization engine 235, and/or the rules identification engine 236 may be combined in a single model. For example, in some embodiments at least two of the NLP engine 230, the content characterization engine 235, and the rules identification engine 236 may be cascaded (e.g., in an ensemble model). In some embodiments, for example, at least two of the NLP engine 230, the content characterization engine 235, and the rules identification engine 236 may be configured as a single model. For example, inputs described for each model may be received and/or generated internally (if needed), and appropriate output(s) (e.g., final outputs) may be generated. Such embodiments may, for example, reduce complexity of operation and/or maintenance. Such embodiments may, for example, enable enhanced associations (e.g., machine learning, statistical modeling) between descriptions, content attributes, predetermined rules, and/or historical data.

The processor 205 is further operably coupled to the data store 145. The data store 145, as depicted, includes package descriptions 240. The package descriptions 240 may, for example, include digital data records stored in the data store 145 including descriptions of package contents. The descriptions may, for example, be textual. As an illustrative example, a package description may be generated for a customs manifest, such as "SOUTHPOLE BLUE JACKET MENS LG. $25." Each of the package descriptions 240 may, for example, be associated with (e.g., include) a unique package identifier (PID).

The data store 145, as depicted, includes content description profiles 245. For example, the content description profiles 245 may include digital data records stored in the data store 145. The content description profiles 245 may, for example, be generated by the processor 205 using the NLP engine 230 as a function of one or more corresponding package descriptions 240. For example, the illustrative package description may be translated into a predetermined language(s). The predetermined language may, for example, be determined as a function of a destination jurisdiction. For example, if the destination jurisdiction is Mexico, and the label is in English, the package descriptions 240 may be translated into Spanish. In some embodiments the NLP engine 230 may, for example, perform the translation. In some embodiments the NLP engine 230 may operate on a translated package description(s).

As depicted, the data store 145 includes predetermined content attributes 250. The predetermined content attributes 250 may, for example, include digital data records stored in the data store 145. The predetermined content attributes may, for example, be associated with one or more jurisdiction-determined attributes. Carrying the illustrative example further, predetermined content attributes may, for example, include clothing, men's clothing, adult clothing, outerwear, polymer fabric, natural fabric. The predetermined content attributes may, for example, correspond to one or more harmonized tariff schedule (HTS). In some embodiments, for example, a predetermined content attribute may include a predetermined association between a predetermined attribute (e.g., of a tangible item) and one or more associated classifications (e.g., in an HTS).

As depicted, the data store 145 includes content attributes profiles 252. The profiles 252 may, for example, include digital data records stored in the data store 145. In some embodiments, such as depicted, the profiles 252 may be generated by the processor 205 using the content characterization engine 235 as a function of at least content description profiles 245 and predetermined content attributes 250. Each of the profiles 252 may, for example, include an association (e.g., via digital metadata, via database entries) between at least one PID and content description profiles. Each of the predetermined content attributes profiles 252 may, for example, include an association between a PID and one or more corresponding predetermined content attributes 250.

In the illustrative jacket example, a corresponding content attribute profile may, for example, associate the package with attributes of "Adult Clothing," "Outerwear," "Nylon fabric," and "Under 1000 pesos." For example, the content characterization engine 235 may have determined (e.g., based on historical data and/or external data sources) that a Southpole brand men's jacket is made of nylon. The content characterization engine 235 may, for example, have determined that the declared value was $25 US Dollars (e.g., based on the origination jurisdiction and the text). The content characterization engine 235 may, for example, have determined that the declared value corresponded to a value less than 1000 MXN (e.g., based on current exchange rates).

As depicted, the data store 145 includes predetermined permission rules 255. The predetermined permission rules 255 may, for example, include digital data records stored in the data store 145. The predetermined permission rules 255 may, for example, be associated with a destination jurisdiction(s). In some embodiments predetermined permission rules 255 may, for example, be associated with one or more content attributes (e.g., predetermined content attributes 250). In some embodiments, predetermined permission rules 255 may, for example, be associated with one or more HTSs. Predetermined permission rules 255 may, for example, be associated with one or more originators, origination locations, and/or origination jurisdictions.

As depicted, the data store 145 includes predetermined permission attributes 260. The predetermined permission attributes 260 may, for example, include digital data records stored in the data store 145. The predetermined permission attributes 260 may, for example, be generated by the processor 205 using the rules identification engine 236. Each of the predetermined permission attributes 260 may, for example, include an association (e.g., via a digital metadata structure, via a database record) between a profile 252 and one or more of the predetermined permission rules 255. Each of the predetermined permission attributes 260 may, for example, include an association between a PID and one or more of the predetermined permission rules 255. In some embodiments the association(s) may be determined, for example, based on a destination jurisdiction of the corresponding PID. The association(s) may, for example, be determined based on the predetermined content attributes 250 in a specific profile 252. The predetermined permission attributes 260 may, for example, advantageously define content-based requirements for a package to be lawfully permitted to enter a destination jurisdiction.

The data store 145 includes predetermined confidence criterions 265. The predetermined confidence criterions 265 may, for example, include digital data records stored in the data store 145. One or more of the predetermined confidence criterions 265 may, for example, associate one or more jurisdiction entry compliance indicators (JECIs) with a permission for a package to enter the destination jurisdiction. One or more of the predetermined confidence criterions 265 may, for example, associate one or more JECIs with a rejection of a package entering the destination jurisdiction. One or more of the predetermined confidence criterions 265 may, for example, be associated with requiring further inspection (e.g., further inspection of package contents).

As an illustrative example, a first confidence threshold may be associated with JECIs associated with a predetermined level of confidence sufficiently high to enter a jurisdiction without further inspection. A second confidence threshold may be associated with JECIs associated with a predetermined level of confidence sufficiently low to reject entry into a jurisdiction without further inspection. A range between the first and second confidence thresholds may, for example, be associated with JECIs which are recommended for further inspection (e.g., manual opening and visual inspection of package contents, radiographic inspection, ultrasonic inspection). Accordingly, various embodiments may advantageously provide a technical solution to enabling a computer system to automatically determine, based on contents of a closed package, whether the package can enter a jurisdiction, should be rejected for entry, and/or should be further inspected.

The data store 145 includes, in the depicted example, predetermined indicia 270. Each of the indicia 270 may, by way of example and not limitation, be associated with a predetermined outcome (e.g., pass, reject, inspect). The indicia 270 may, for example, each be associated with one or more predetermined confidence criterions 265. In some embodiments the indicia 270 may include visual indicia. Visual indicia may, for example, include graphic elements (e.g., icons). Visual indicia may, for example, include colors. One or more of the indicia 270 may, for example, include instructions such that the processor 205 may cause a display device (e.g., display 150) to generate a human-readable display of an indicia related to automatic inspection of a package.

As an illustrative example, green may be associated, by way of example and not limitation, with an automatic determination to pass the package without further inspection. Red may, for example, be associated with an automatic determination to reject the package without further inspection. Yellow may, for example, be associated with an automatic determination to perform further inspection of the package. In various embodiments, various color schemas may be used. For example, the color schemas may be pre-configured by an administrator. Accordingly, various embodiments may advantageously provide a technical solution to enable computers to communicate automatic content inspection results and/or resulting determined actions (e.g., pass, reject, inspect) to human operators.

Figure 3:
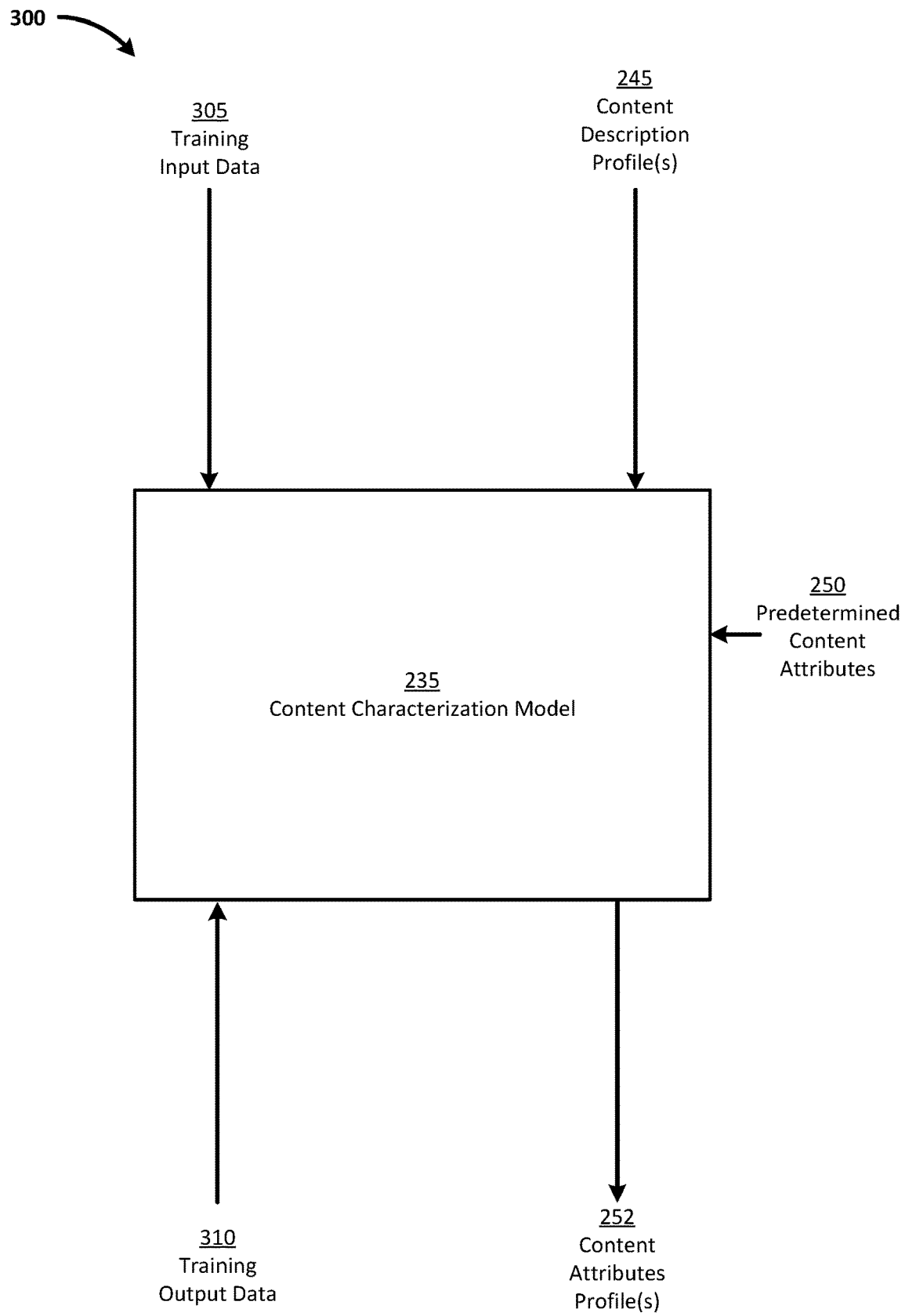
FIG. 3 depicts an exemplary machine learning engine for content characterization.

FIG. 3 depicts an exemplary machine learning engine for content characterization. In an exemplary scenario 300, the content characterization engine 235 includes a machine learning model. The machine learning model may, by way of example and not limitation, include a neural network model. The neural network model may include, for example, recurrent neural network (RNN) and/or deep neural network (DNN). The machine learning model may, for example, include an ensemble model. Different neural network models may be selected. The number of the model layers (e.g., the hidden neurons) may also be determined based on, for example, the complexity of content descriptions and/or attributes.

A set of training data is applied to the content characterization engine 235 to train the machine learning model. The training data includes a set of training input data 305 and a set of training output data 310. The set of training input data 305 may include historical package descriptions 240. The training input data 305 may include, for example, historical content description profiles 245. The training input data 305 may include, for example, current and/or historical predetermined content attributes 250.

The set of training output data 310 may include historical content attributes profiles 252. The training output data 310 may, for example, be selected to correspond to the training input data 305. As an illustrative example, historical content attributes profiles and historical content description profiles may be selected based on PIDs (e.g., matching PIDs). As an illustrative example, historical content attributes profiles and predetermined content attributes may be selected based on time (e.g., content attributes available at a time the content attributes profiles were generated).

In some embodiments, before training, a set of testing data (including testing input data and testing output data) may be divided from the training data. After the content characterization engine 235 is trained, the testing data may be applied to the trained model to test the training accuracy of the model. For example, the trained model may receive the testing input data and generate an output data in response to the testing input data. The generated output data may be compared with the testing output data to determine the prediction accuracy (e.g., based on a predetermined criterion(s) such as a maximum error threshold). In some embodiments, one or more models (e.g., neural network models) may be cascaded together. The cascaded model may be trained and tested.

During operation, a content description profiles 245 and a predetermined content attributes 250 may be provided as inputs to the (trained) content characterization engine 235. The content characterization engine 235 may generate, in response a corresponding content attributes profile(s) 252.

Figure 4:
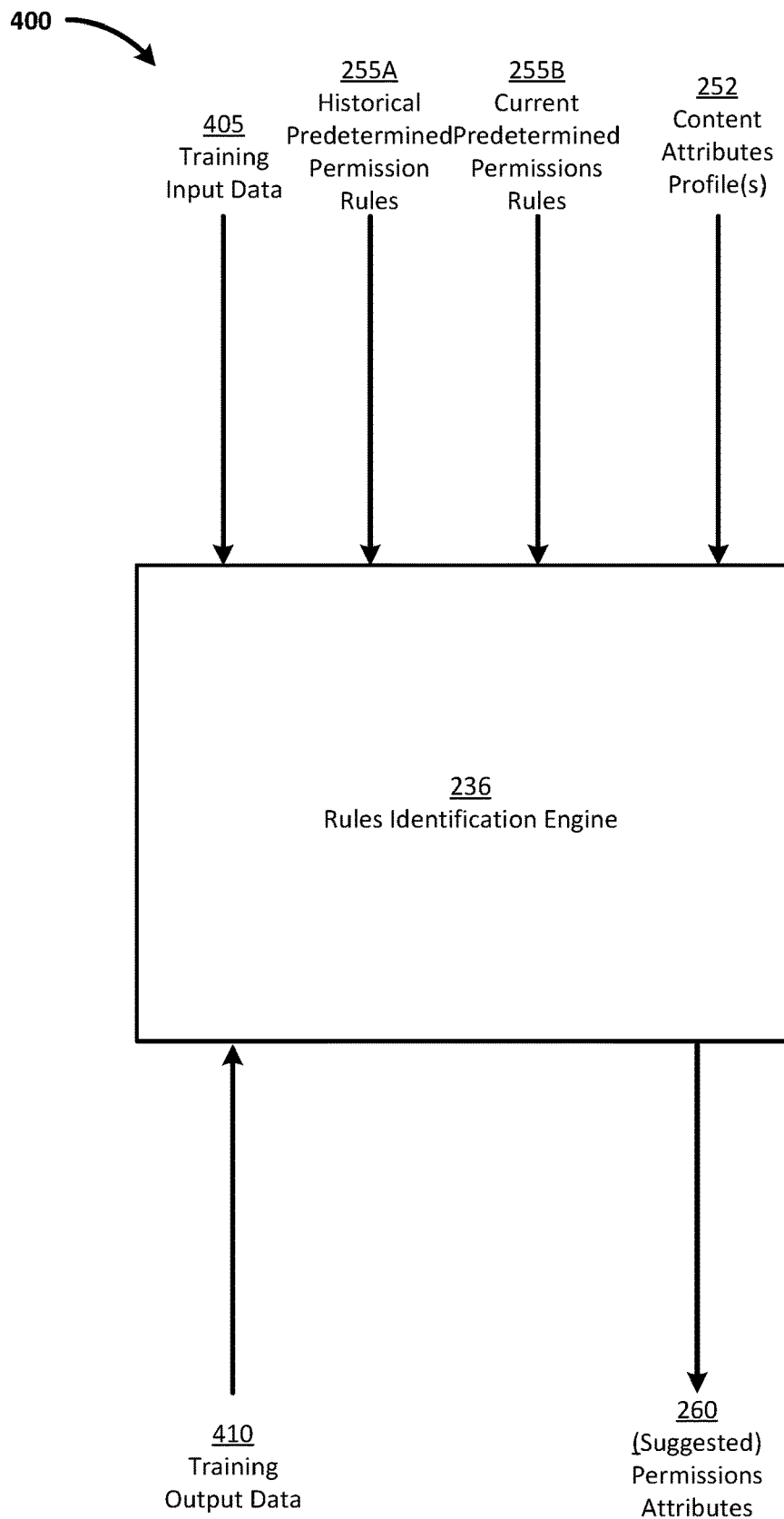
FIG. 4 depicts an exemplary machine learning engine for rules identification.

FIG. 4 depicts an exemplary machine learning engine for rules identification. In an exemplary scenario 400, the content characterization engine 235 includes a machine learning model. The machine learning model may, by way of example and not limitation, include a neural network model. The neural network model may include, for example, recurrent neural network (RNN) and/or deep neural network (DNN). The machine learning model may, for example, include an ensemble model. Different neural network models may be selected. The number of the model layers (e.g., the hidden neurons) may also be determined based on, for example, the complexity of content descriptions and/or attributes.

A set of training data is applied to the rules identification engine 236 to train the machine learning model. The training data includes a set of training input data 405 and a set of training output data 410. The set of training input data 405 may include, by way of example and not limitation, historical predetermined permission rules 255A (e.g., from the predetermined permission rules 255). The set of training input data 405 may include, by way of example and not limitation, current predetermined permissions rules 255B (e.g., from the predetermined permission rules 255). The training input data 405 may include, for example (historical) content attributes profiles 252.

The set of training output data 310 may include historical predetermined permission attributes 260. The training output data 310 may, for example, be selected to correspond to the training input data 305. As an illustrative example, historical permissions attributes and historical content attributes profiles may be selected based on PIDs (e.g., matching PIDs). As an illustrative example, historical predetermined permissions rules may be selected based on time (e.g., predetermined permissions rules available at a time the permissions attributes were determined). As an illustrative example, historical and/or current predetermined permissions rules may be selected based on destination jurisdiction (e.g., predetermined permissions rules corresponding to a destination jurisdiction(s) associated with the historic content attributes profiles).

In some embodiments, before training, a set of testing data (including testing input data and testing output data) may be divided from the training data. After the rules identification engine 236 is trained, the testing data may be applied to the trained model to test the training accuracy of the model. For example, the trained model may receive the testing input data and generate an output data in response to the testing input data. The generated output data may be compared with the testing output data to determine the prediction accuracy (e.g., based on a predetermined criterion(s) such as a maximum error threshold). In some embodiments, one or more models (e.g., neural network models) may be cascaded together. The cascaded model may be trained and tested.

During operation, a profiles 252 and a predetermined permission rules 255 (e.g., current predetermined permissions rules 255B) may be provided as inputs to the (trained) rules identification engine 236. The rules identification engine 236 may generate, in response to the input (suggested) predetermined permission attributes 260.

Figure 5:
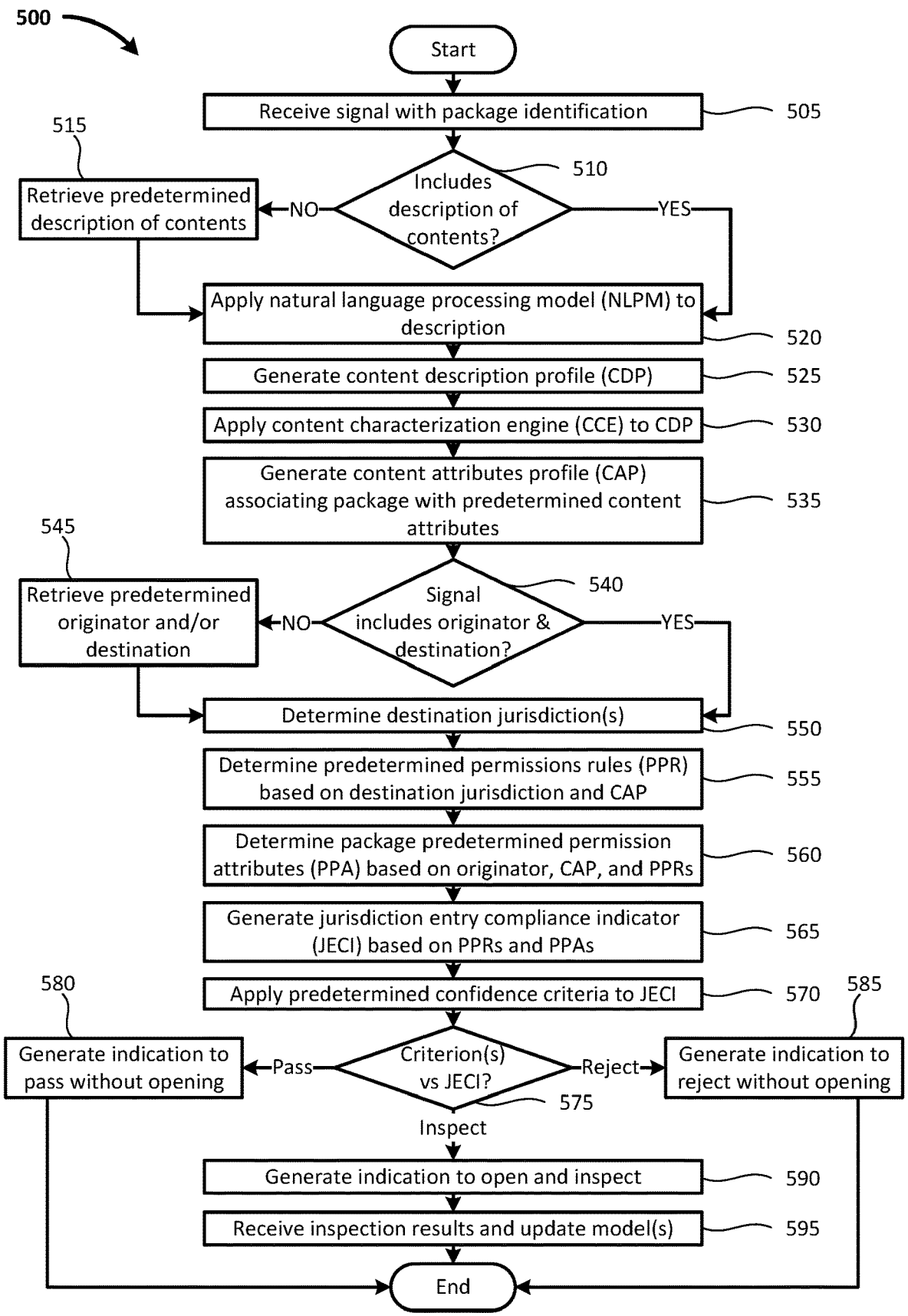
FIG. 5 depicts an exemplary method for automatic package content inspection.

FIG. 5 depicts an exemplary method for automatic package content inspection. A method 500 may, for example, be performed by a processor(s) (e.g., processor 205) executing a program(s) of instructions retrieved from a data store(s) (e.g., data store 145). In the method 500, a signal is received, in a step 505, identifying a package (e.g., by a unique PID). The signal may, for example, be received in response to scanning a package (e.g., label 125 of the package 105). If it is determined, at a decision point 510, that the received signal includes a description (e.g., package descriptions 240) of the package contents, then an NLP model (e.g., NLP engine 230) is applied, in a step 520, to the description. Otherwise, a predetermined description of contents (e.g., package descriptions 240) is retrieved, in a step 515 (e.g., based on the PID) and then the NLP model is applied in the step 520. The description of contents may, for example, be pre-translated. The description of contents may, for example, be translated by the NLP. A content description profile (CDP, e.g., content description profiles 245) is generated, in a step 525, from the NLP model applied in the step 520.

A content characterization engine (CCE, e.g., content characterization engine 235) is applied, in a step 530, to the CDP. The CCE generates, as an output, a content attributes profile (CAP, e.g., profiles 252) in a step 535. The CAP associates the package (e.g., the PID) at least with predetermined content attributes (e.g., the predetermined content attributes 250).

If it is determined, in a decision point 540, that the signal (received in the step 505) includes an indication of the originator and destination of the package, then the method 500 proceeds to a step 550 to determine a destination jurisdiction(s) corresponding to the package destination. Otherwise, a predetermined originator and/or destination is retrieved (e.g., based on the PID) in a step 545 and the method 500 then proceeds to the step 550.

Predetermined permissions rules (e.g., predetermined content attributes 250) are determined, in a step 555, based at least on the destination jurisdiction and the CAP. For example, the predetermined permissions rules may be identified and/or retrieved based on the destination jurisdiction and the CAP. The predetermined permissions rules may, for example, be identified using the rules identification engine 236.

In a step 560, predetermined permission attributes (e.g., predetermined permission attributes 260) are determined for the package based on the originator, the CAP, and/or the predetermined permission attributes. In some embodiments, for example, the predetermined permission attributes may be determined using the rules identification engine 236. The predetermined permission attributes may, for example, include permits required to enter. The predetermined permission attributes may, for example, include attributes associated with a simplified entry process (e.g., if the content attributes profiles met predetermined permissions rules qualifying for a simplified process).

A JECI is generated, in a step 565, based on the predetermined permission attributes for the package and the corresponding predetermined permission rules. The JECI may, for example, include a score. The JECI may, for example, include a confidence interval of compliance of the package with the predetermined permissions rules based on the predetermined permissions attributes. A predetermined confidence criterion(s) (e.g., selected from the predetermined confidence criterions 265) is applied to the JECI in a step 570.

In the depicted example, if a comparison of the criterion(s) to the JECI in a decision point 575, corresponds to an automatic decision to pass, an indication to permit the package to enter without opening it is generated (e.g., a human-readable visual indication(s)) in a step 580. If the comparison corresponds to an automatic decision to reject, an indication to refuse the package entrance without opening it is generated (e.g., a human-readable visual indication(s)) in a step 585. Otherwise, in the depicted example, an indication is generated (e.g., a human-readable indication(s)) is generated, in a step 590, indicating that the package should be further inspected (e.g., opened and inspected by a human worker).

In some embodiments the indication to inspect may, by way of example and not limitation, indicate a specific area of uncertainty. As an illustrative example, referring to the jacket example, if the contents are determined to be a jacket, but the target age range is uncertain, the indication to inspect may prompt a human to ascertain, for example, whether the jacket is for a person greater than 3 years old (e.g., corresponding to a predetermined permission rule associating additional permit requirements with articles for children ≤3 years). As an illustrative example, the indication to inspect may prompt a human to ascertain, for example, whether the jacket contains natural fibers (e.g., corresponding to a predetermined permission rule associating additional permit requirements with articles made of natural fibers).

Subsequently, in a step 595, an inspection results signal(s) is received (e.g., after being prompted by the display generated in response to the step 590) and one or more models are updated accordingly. For example, the NLP engine may be updated based on corrections to a description. The CCE may be updated based on corrections to attributes (e.g., in a CAP) identified from the CDP. The rules identification engine may, for example, be updated based on corrections to predetermined permission attributes identified from the CAP.

In some embodiments, customs form(s) may be generated (step not shown) based, for example, at least on the predetermined permissions attributes, predetermined permissions rules, and/or CAP. For example, the customs forms may be generated based on predetermined permits associated with the originator and the content attributes. The predetermined permits may, for example, correspond to predetermined permission attributes identified. The forms may be (automatically) populated using the CAP identified based on the predetermined permission rules identified. Accordingly, various embodiments may advantageously reduce time spent by humans in generating and/or reviewing forms to a fraction of the time spent manually identifying and filling out information in customs forms.

Figure 6:
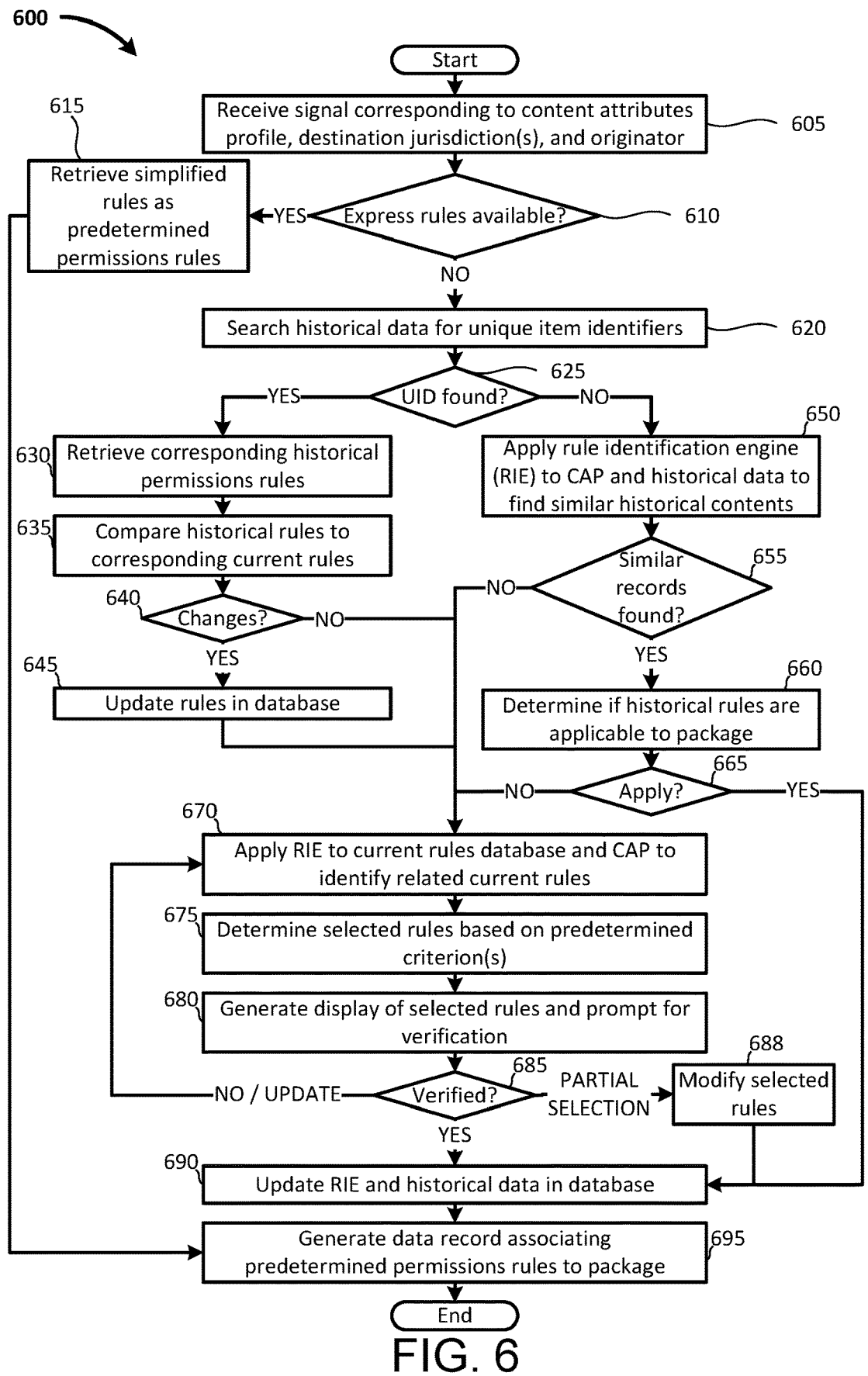
FIG. 6 depicts an exemplary method for automatic determination of predetermined permissions rules.

FIG. 6 depicts an exemplary method for automatic determination of predetermined permissions rules. A method 600 may, for example, be performed by a processor(s) (e.g., processor 205) executing a program(s) of instructions retrieved from a data store(s) (e.g., data store 145). The method 600 includes, at a step 605, receiving a signal(s) corresponding to a content attributes profile (CAP), destination jurisdiction(s), and originator for at least one package. The signal(s) may, for example, be received after the step 550 as disclosed at least with reference to FIG. 5.

At a decision point 610, if express rules (e.g., simplified rules) are determined to be available (e.g., based on the destination jurisdiction(s)), then the simplified rules are retrieved as predetermined permissions rules in a step 615, and the method 600 proceeds to a step 695. As an illustrative example, express rules may include simplified rules (such as Mexico's T1 entry process for packages under a maximum declared value threshold).

If express rules are determined, in the decision point 610, to not be available, then historical data (e.g., in one or more databases) is searched, in a step 620, for unique item identifiers (UIDs). The UIDs may, for example, be specified in the CAP(s). The UIDs may, for example, be declared in the CDP and/or may be determined based on the CDP and historical CAPs. If the UID(s) are determined to be found, in a decision point 625, then historical permissions rules (e.g., historical predetermined permission rules 255A) associated with the UID(s) are retrieved (e.g., via historical predetermined permission attributes 260) in a step 630. The historical rules are compared, in a step 635, to corresponding current rules (e.g., the current predetermined permissions rules 255B). The current rules may be determined to correspond, for example, based on a corresponding HTS. If changes are determined, in a decision point 640, to exist between the historical permissions rules and the corresponding current rules, then the rules are updated in a database in a step 645, and the method 600 proceeds to a step 670.

If it is determined, in the decision point 625, that the UID is not found in the historical data, then a rule identification engine (RIE) is applied, in a step 650, to the CAP and the historical data to find similar historical contents. If it is determined, in a decision point 655, that similar records are not found, then the method 600 proceeds to the step 670. Otherwise, it is determined, in a step 660, whether historical rules retrieved based on similar historical records are applicable to the package contents (e.g., based on the CAP). In some embodiments the rules may be automatically reviewed based on predetermined criterion (e.g., statistical similarity criteria). In some embodiments the rules may be (visually) presented to a (human) reviewer(s) for verification of applicability.

If the historical rules are determined to apply to the package contents, in a decision point 665, then the method 600 proceeds to a step 690. Otherwise, the method 600 proceeds to the step 670.

In the step 670, the RIE is applied to a current rules database (e.g., predetermined permission rules 255) and the CAP to identify related current rules. In a step 675, selected rules are determined based on predetermined criterion(s). For example, the predetermined criterion(s) may include predetermined confidence criterions 265. A display of the selected rules is then generated, in a step 680. The display may, for example, be a human-readable display (e.g., on the display 150). The display may include a prompt for verification of the selected rules (e.g., from a human reviewer).

If it is determined, in a decision point 685, that an input signal is received corresponding to verification of the selected rules (e.g., for applicability to the package), then the method 600 proceeds to the step 690. If it is determined, in the decision point 685, that an input signal is received corresponding to a rejection of the rules and/or updated criteria (e.g., filters, weighting modifications), then the method 600 returns to step 670 to apply the RIE based on the input received from the reviewer. If it is determined, in the decision point 685, that an input signal is received corresponding to a selection of some of the suggested rules selected in the step 675 and presented in the step 680, then the set of selected rules is modified, in a step 688, based on the input from the reviewer, and the method 600 proceeds to the step 690.

In the step 690, the RIE is updated (e.g., as disclosed at least with reference to FIG. 4 and FIG. 8) and the historical data (e.g., associations between content attributes and predetermined permissions rules) is updated. A data record is generated, in the step 695, associating the predetermined permissions rules to the package (e.g., based on the PID), and the method 600 ends.

Figure 7:
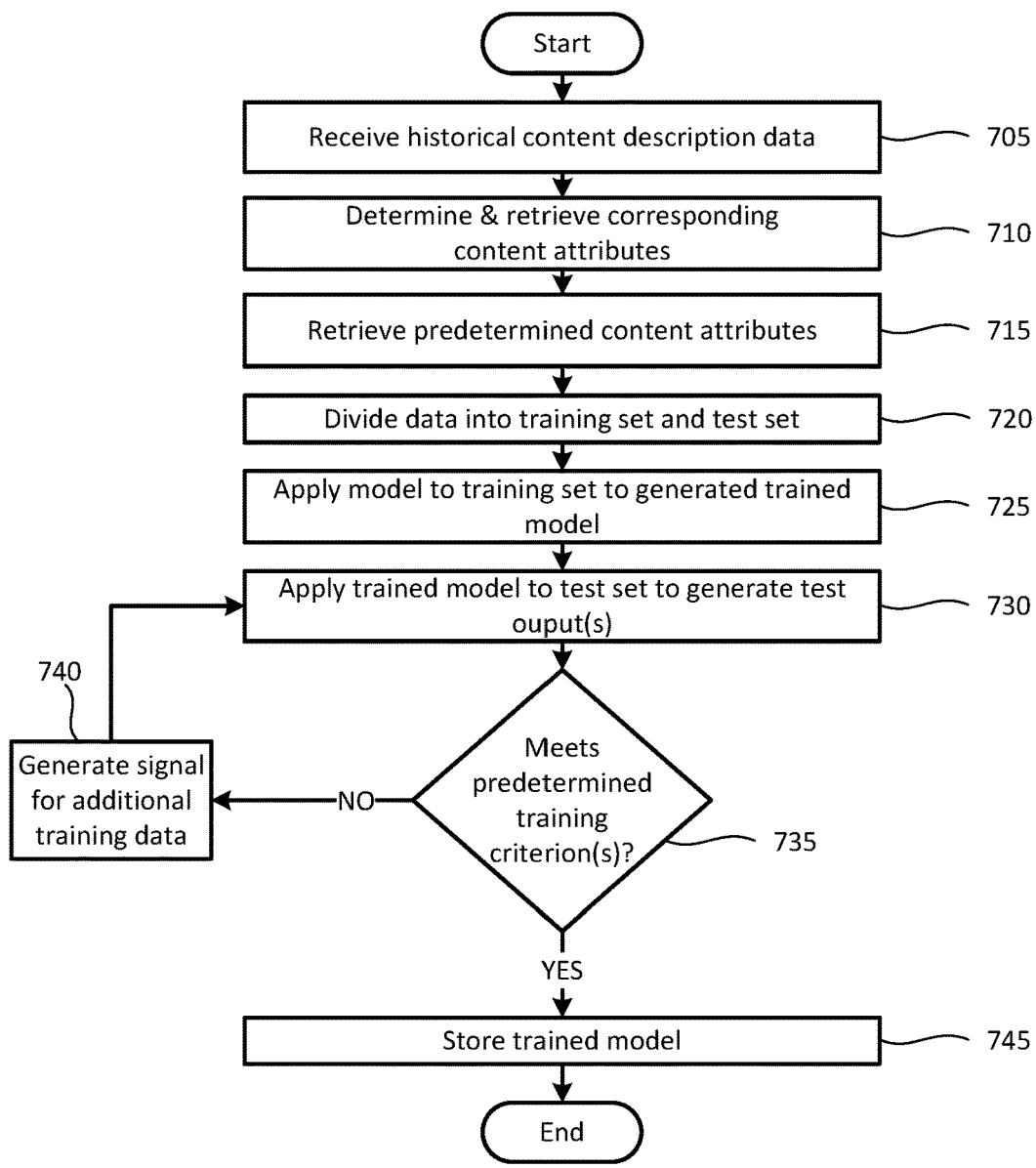
FIG. 7 depicts an exemplary method of training a content characterization engine.

FIG. 7 depicts an exemplary method of training a content characterization engine. A method 700 may, for example, be performed by a processor(s) (e.g., processor 205) executing a program(s) of instructions retrieved from a data store(s) (e.g., data store 145). The method 700 includes, at a step 705, receiving the historical content description data (e.g., historical content description profiles 245). At a step 710, corresponding content attributes (e.g., historic content attributes profiles 252) are determined and retrieved. Predetermined content attributes (e.g., predetermined content attributes 250) are retrieved in a step 715.

At a step 720, the retrieved data is divided into a first set of data used for training and a second set of data used for testing. At a step 725, a model (e.g., a model(s) of the content characterization engine 235) is applied to the training data to generate a trained model (e.g., neural network model). The trained model is applied to the testing data, in a step 730, to generate test output(s) (e.g., content attribute profile(s)). The output is evaluated, in a decision point 735, to determine whether the model is successfully trained (e.g., by comparison to a predetermined training criterion(s)). The predetermined training criterion(s) may, for example, be a maximum error threshold. For example, if a difference between the actual output (the test data) and the predicted output (the test output) is within a predetermined range, then the model may be regarded as successfully trained. If the difference is not within the predetermined range, then the model may be regarded as not successfully trained. At a step 740, the processor may generate a signal(s) requesting additional training data, and the method 700 loops back to step 730. If the model is determined, at the decision point 735, to be successfully trained, then the trained model may be stored (e.g., in the storage module 225), in a step 745, and the method 700 ends.

Figure 8:
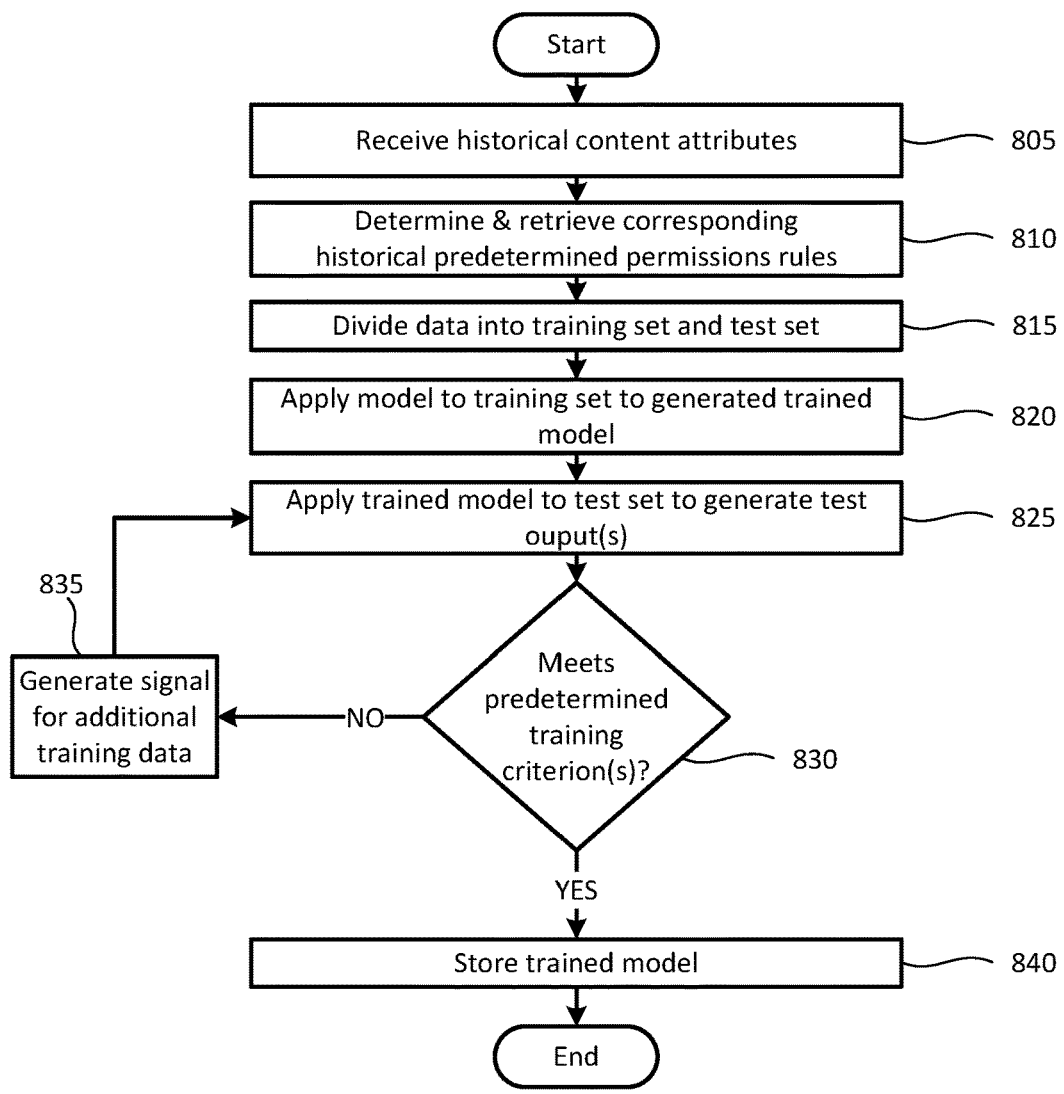
FIG. 8 depicts an exemplary method of training a rules identification engine.

FIG. 8 depicts an exemplary method of training a rules identification engine. A method 800 may, for example, be performed by a processor(s) (e.g., processor 205) executing a program(s) of instructions retrieved from a data store(s) (e.g., data store 145). The method 800 includes, at a step 805, receiving the historical content attributes (e.g., historic content attributes profiles 252). At a step 810, corresponding (historical) predetermined permissions rules (e.g., historical predetermined permission rules 255A and/or current predetermined permissions rules 255B) are determined and retrieved.

At a step 815, the retrieved data is divided into a first set of data used for training and a second set of data used for testing. At a step 820, a model (e.g., a model(s) of the rules identification engine 236) is applied to the training data to generate a trained model (e.g., neural network model). The trained model is applied to the testing data, in a step 825, to generate test output(s) (e.g., content attribute profile(s)). The output is evaluated, in a decision point 830, to determine whether the model is successfully trained (e.g., by comparison to a predetermined training criterion(s)). The predetermined training criterion(s) may, for example, be a maximum error threshold. For example, if a difference between the actual output (the test data) and the predicted output (the test output) is within a predetermined range, then the model may be regarded as successfully trained. If the difference is not within the predetermined range, then the model may be regarded as not successfully trained. At a step 835, the processor may generate a signal(s) requesting additional training data, and the method 800 loops back to step 825. If the model is determined, at the decision point 830, to be successfully trained, then the trained model may be stored (e.g., in the storage module 225), in a step 840, and the method 800 ends.

Figure 9:
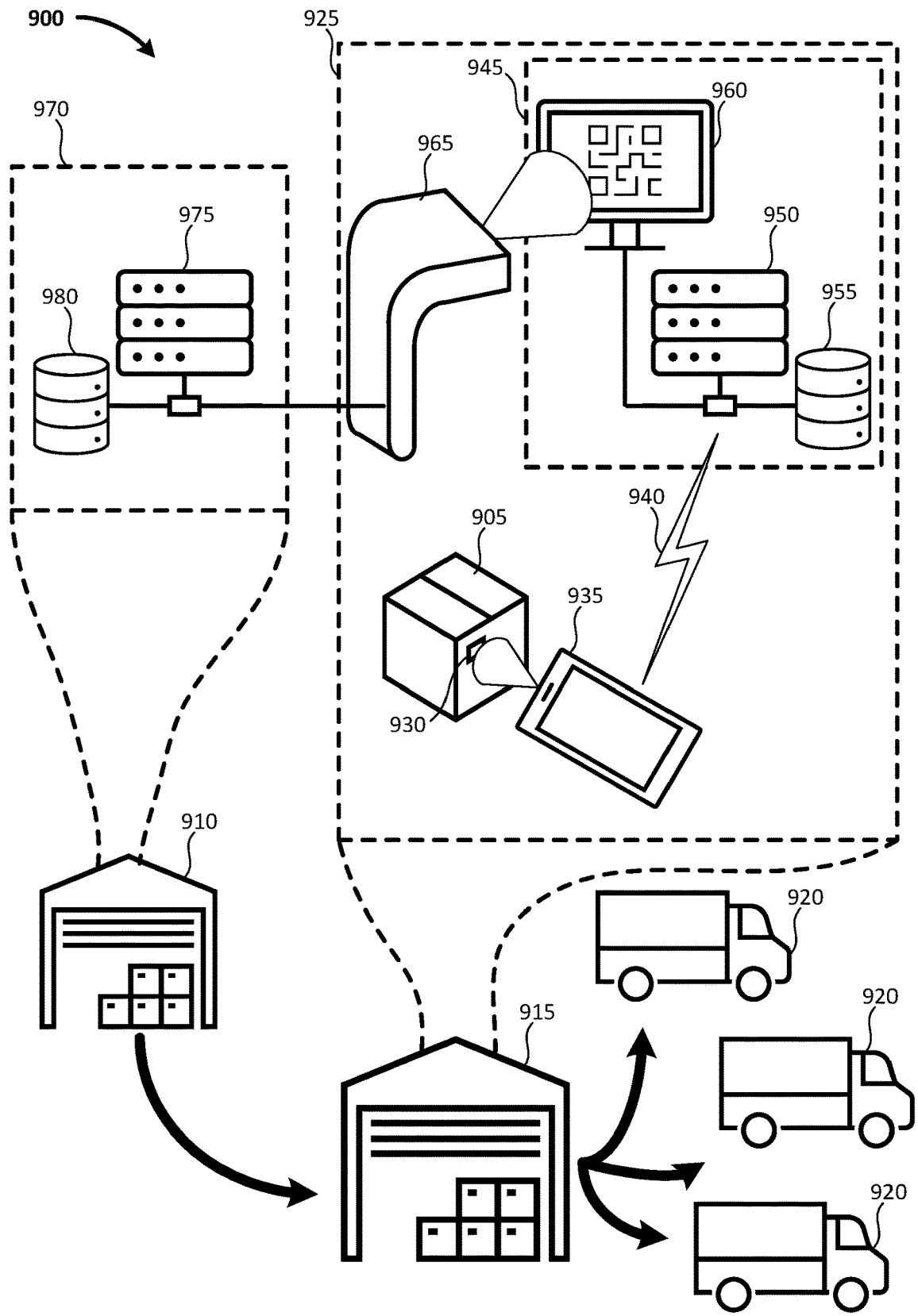
FIG. 9 depicts an exemplary scanner multiplier system (SMS) employed in an illustrative use-case scenario.

FIG. 9 depicts an exemplary scanner multiplier system (SMS) employed in an illustrative use-case scenario. In an exemplary scenario 900, a package 905 is transported from an originator 910 to a distribution facility 915. The distribution facility 915 may, for example, determine a transport 920 to load the package 905 onto for further delivery based on details associated with the package 905.

In the depicted example, the distribution facility 915 operates an SMS 925. The SMS 925 optically connects a first scanning system associated with a (data) network of the distribution facility 915 with a second scanning system associated with a (data) network of the originator 910. The SMS 925 may, by way of example and not limitation, advantageously (optically) connect otherwise isolated (e.g., electronically isolated) data networks and/or systems.

As depicted, the package 905 includes a label 930. The label 930 may, for example, include a code. The code may, for example, be optically readable (e.g., a barcode, QR code). A scanning device 935 (e.g., smartphone, barcode reader) may (optically) scan the label 930 and generate a signal corresponding to the code defined by the label 930. The scanning device 935 is coupled by a wireless link 940 to an optical multi-master scanning system 945 of the SMS 925. The scanning device 935 may, for example, transmit a signal containing the code identifying the package 905 to a controller 950 of the optical multi-master scanning system 945. The controller 950 is operably coupled to a database 955, which may store the code. For example, the controller 950 and the database 955 may be used to generate forms (e.g., customs broker forms) based on data corresponding to the package 905. The database 955 may, for example, be used to store a record of packages scanned in the distribution facility 915.

The controller 950 is further operably coupled to a display device 960. The 950 may generate and transmit signal(s) to the display device 960 corresponding to the code(s) received from the scanning device 935. The signal(s) to the display device 960 may operate the display device 960 to generate a (visual) display of the code (e.g., a QR code as shown, a barcode).

A scanning device 965 may, for example, be configured to scan the display device 960. For example, the scanning device 965 may be mechanically mounted to monitor the display device 960.

The scanning device 965 may be operated (e.g., internally, externally) to repeatedly scan the display device 960. In some embodiments, for example, the scanning device 965 may scan the display device 960 at a predetermined time interval. The display device 960 may, for example, generate a display of a next available scanned code at the predetermined time interval (as available). For example, codes scanned by the scanning device 935 may be stored in a cache, for example, and optically presented on the display device 960 (e.g., in a predetermined order) to the scanning device 965.

In some embodiments, the display device 960 may be operated by a trigger. For example, the controller 950 and/or the display device 960 may generate a trigger signal when a new code is displayed on the display device 960. The trigger signal may be transmitted to the scanning device 965 to cause the scanning device 965 to scan the display device 960.

The scanning device 965, as depicted, is operably coupled to an originator network 970. The originator network 970 may, for example, receive the codes as scanned by the 965. The originator network 970 includes, in the depicted example, a controller 975. The scanning device 965 is operably coupled to the controller 975. The controller 975 is operably coupled to a database 980. Accordingly, the scanning device 965 may transmit the code(s) presented on the display device 960 to the controller 975 (e.g., for storage in the database 980).

Various embodiments may advantageously allow a single scanning device 935 to report to multiple different (e.g., electronically isolated) master systems simultaneously. Such embodiments may advantageously reduce labor in scanning (e.g., scanning into the optical multi-master scanning system 945 and scanning separately into the originator network 970). Accordingly, such embodiments may advantageously reduce energy expenditure, handling costs, and/or laborer fatigue. Such embodiments may advantageously provide a technical solution to a technological problem of simultaneously verifying that a package is scanned to multiple systems with a single scanning operation. Various embodiments may advantageously reduce a cost of equipment by allowing an inexpensive scanner to be used and optically connected to one or more higher cost 'base' scanners.

Figure 10:
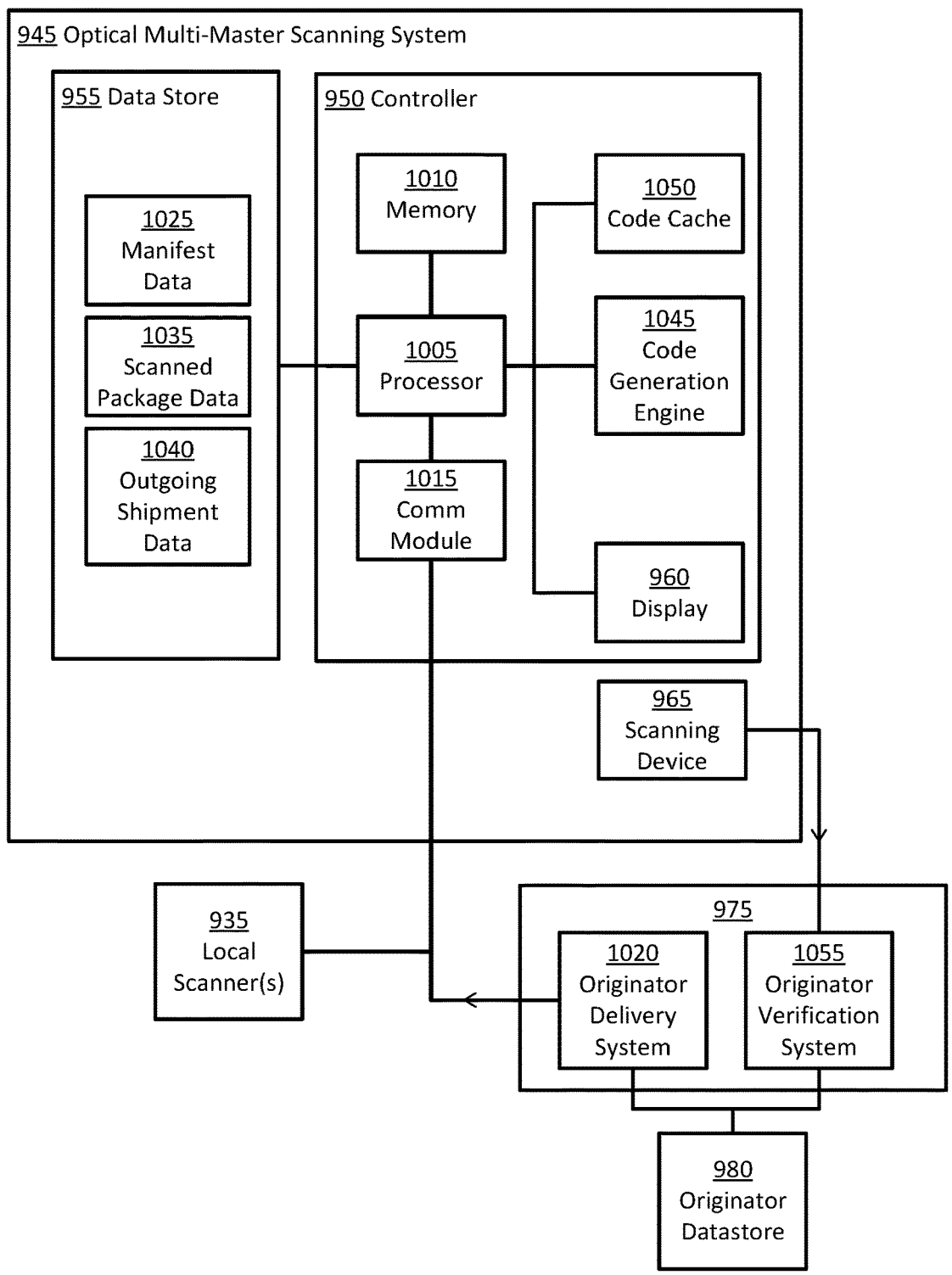
FIG. 10 depicts an exemplary block diagram of the exemplary SMS.

FIG. 10 depicts an exemplary block diagram of the exemplary SMS. In a depicted exemplary system 1000, the optical multi-master scanning system 945 includes the controller 950 and the database 955. The controller 950 includes a processor 1005. The processor 1005 may, for example, include one or more processors. The processor 1005 is operably coupled to a memory module 1010 (e.g., one or more random-access memory modules). The processor 1005 is operably coupled to a communication module 1015. The communication module 1015 may, for example, include wireless communication. The communication module 1015 may, for example, include wired communication.

As depicted, the processor 1005 is operably coupled, via the communication module 1015, to the scanning device 935 and the controller 975. The processor 1005 may, for example, receive manifest data 1025 (e.g., a file such as a tabulated data, database package, XML file, metadata) from an originator delivery system 1020 of the controller 975. The processor 1005 may store the manifest data 1025 in the database 955. The manifest may, for example, include a series of package identifiers (PIDs) and associated package information (e.g., destination, contents description, originator). In some embodiments the originator delivery system 1020 may not be operably coupled to the communication module 1015. For example, the shipping manifest may be scanned, emailed, uploaded and/or otherwise stored into the database 955.

The processor 1005 may receive a code from the scanning device 935 (e.g., scanning a package associated with the manifest data 1025). The processor 1005 may store the code in a code cache 1050 (e.g., random-access and/or non-volatile memory). The processor 1005 may retrieve corresponding data from the manifest data 1025 to identify the package associated with the code. For example, the processor 1005 may store associated scanned package data 1035. The associated scanned package data 1035 may, for example, include data retrieved from the manifest data 1025 for the package. The associated scanned package data 1035 may include, for example, scanning information (e.g., size, weight, time, associated personnel). The associated scanned package data 1035 may, for example, include content descriptions, originator, and/or destination associated with the package (e.g., retrieved from the manifest data 1025).

The processor 1005 may, for example, further generate, receive, and/or store outgoing shipment data 1040 associated with the package. For example, the outgoing shipment data 1040 may include a shipping route (e.g., corresponding to a transport 920) associated with the package. The outgoing shipment data 1040 may, for example, include a location of the package in a shipping carton and/or transport (e.g., truck identifier, carton identifier). The outgoing shipment data 1040 may, for example, include permission, permit, and/or customs data associated with the package (e.g., as disclosed at least with reference to FIGS. 1-8).

The processor 1005 is operably coupled to a code generation engine 1045. The code generation engine 1045 may, for example, generate a code in response to a signal corresponding to a code. For example, the code generation engine 1045 may receive a PID (e.g., stored in the code cache 1050) and generate a corresponding code according to a predetermined standard (e.g., QR code, barcode).

The processor 1005 is operably coupled to the display device(s) 960. The processor 1005 may generate one or more signals, based on codes in the code cache 1050 (e.g., received from the scanning device 935, processed by the code generation engine 1045), to the display device 960. In some embodiments, by way of example and not limitation, the processor 1005 may generate the signal(s) in response to a timer, a status of the code cache 1050, a signal received from the scanning device 935, or some combination thereof. The signal(s) to the display device 960 may cause the display device 960 to display a corresponding code from the code cache 1050 (e.g., previously received from the scanning device 935). The scanning device 965 may (optically) scan the display device 960 and generate a signal corresponding to the code (visually) displayed on the display device 960.

The scanning device 965 may transmit the generated signal(s) to an originator verification system 1055 of the controller 975. The originator verification system 1055 is operably coupled to the database 980. For example, the originator verification system 1055 may check the code received from the scanning device 965 against a record stored in the database 980 by the originator delivery system 1020 (e.g., manifest data corresponding to manifest data stored in the manifest data 1025). Accordingly, the controller 975 may verify that the package(s) was physically scanned by the distributor. The distributor may advantageously avoid duplication of scanning efforts by multiplying a single scanning operation by a 'slave' scanner (scanning device 935) across a master controller 950 of the distributor's system and a master scanning device 965 of the originator's system. Accordingly, the originator may advantageously avoid modifying their network or introducing security vulnerabilities by using a physical scanning device approved by the originator, while still receiving the benefit of reduced costs and reduced processing time achieved by the distributor performing a single scanning operation per package. Such embodiments may, for example, advantageously provide a technical solution to a technological problem of physically scanning a package once when multiple physical scanners must scan the same package.

In the depicted example, the arrows between the scanning device 965 and the originator verification system 1055 and between the originator delivery system 1020 and the communication module 1015 may, at least in some embodiments, indicate one way communication (e.g., only).

Figure 11:
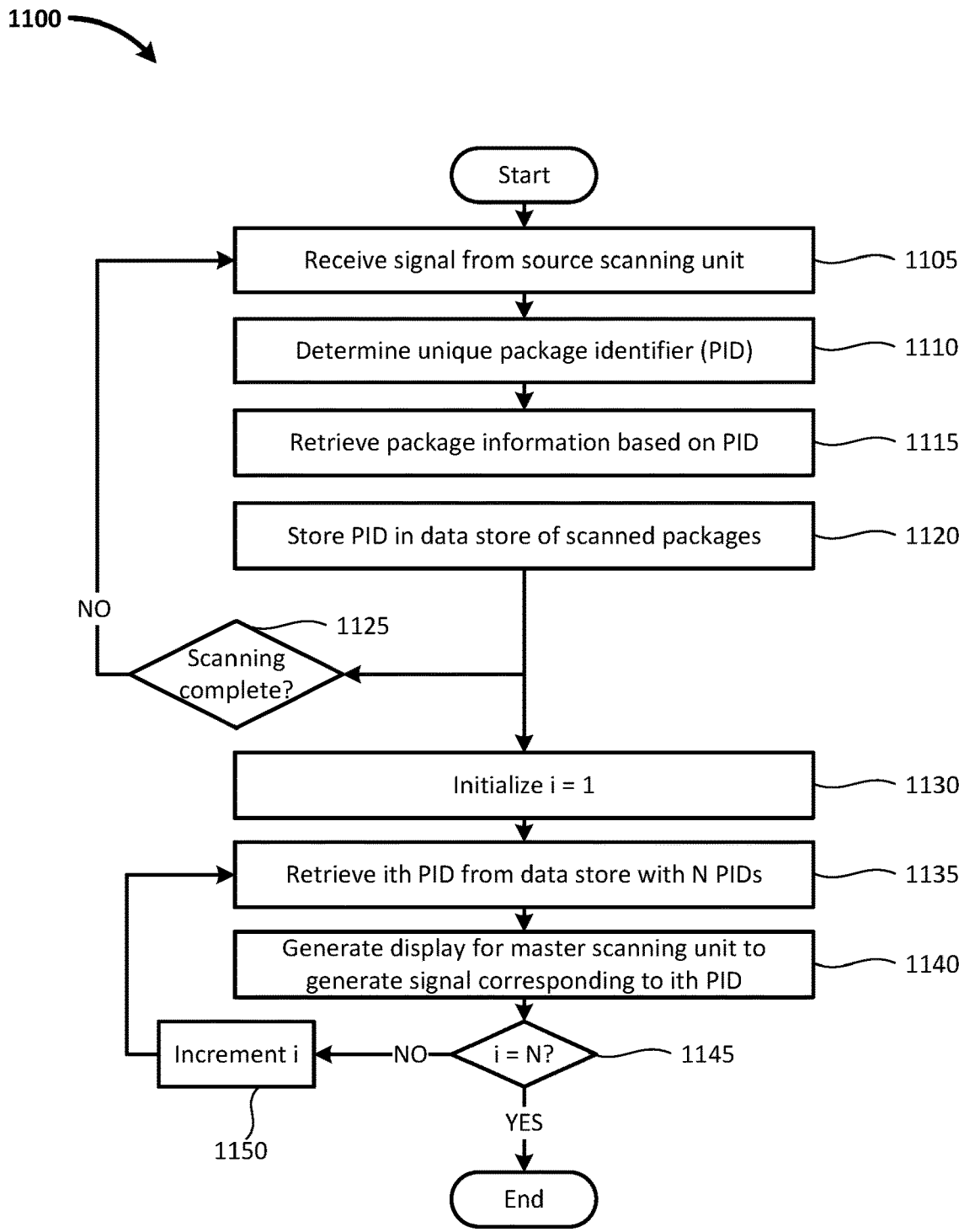
FIG. 11 depicts an exemplary method of scanner multiplication.

FIG. 11 depicts an exemplary method of scanner multiplication. A method 1100 may, for example, be performed by a processor(s) (e.g., processor 1005) executing a program(s) of instructions retrieved from a data store(s) (e.g., database 955, code generation engine 1045). In the method 1100, a signal is received, in a step 1105, from a source scanning unit (e.g., the scanning device 935) corresponding to a code associated with a (physical) package. A unique PID is determined, in a step 1110, corresponding with the code. For example, the code may be or include the PID. The PID may, for example, be generated and/or retrieved (e.g., from the database 955) as a function of the code. Package information is retrieved, in a step 1115, based on the PID (e.g., from the database 955). The PID is stored, in a step 1120, in a data store of scanned packages (e.g., the code cache 1050).

If it is determined, at a decision point 1125, that scanning is not complete (e.g., based on a timeout period, based on absence of a signal of completion), then the method 1100 continues to monitor to receive a signal at the step 1105.

A counter variable i is initialized (e.g., to 1, as depicted) in a step 1130. An ith PID is retrieved, in a step 1135, from a data store with N PIDs. In some embodiments, for example, the data store with N PIDs may include the code cache 1050. In some embodiments, N may be dynamically updated based on code(s) continuing to be received from one or more source scanning units.

A display is generated (e.g., by the display device 960), in a step 1140, for (at least one) master scanning unit (e.g., the scanning device 965). The display corresponds to the ith PID. For example, the display may be a (visual) code corresponding to the ith PID in a (predetermined) schema that the master scanning unit is configured to recognize. The code may, by way of example and not limitation, be determined and/or generated by the code generation engine 1045.

If it is determined, at a decision point 1145, that all the PIDs have been processed (e.g., i=N, as depicted), then the method 1100 ends. Otherwise, the counter is incremented in a step 1150, and the method 1100 loops back to the step 1135.

Although various embodiments have been described with reference to the figures, other embodiments are possible.

Although an exemplary system has been described with reference to the figures, other implementations may be deployed in other industrial, scientific, medical, commercial, and/or residential applications.

For example, in some embodiments, the scanning device 935 may, for example, include a camera. For example, the camera may provide a (digital) image of the package (e.g., a label of the package, a portion of the package, a view of the entire package) to the code cache 1050 as the 'code'. The image may be stored and/or analyzed by multiple systems via display of the image(s) (e.g., on the display device 960) and optical analysis of the display (e.g., by the scanning device 965). In some embodiments, for example, a single scan (e.g., by the scanning device 935) may be stored and different portions may be provided to different masters via one or more displays. For example, a barcode from the package may be provided to one system. A physical display of the package may be provided to another system. In some embodiments, for example, the objects scanned may be other than packages (e.g., manufacturing items).

Some embodiments may, for example, implement a multi-master scanner system in which source scanners provide input to at least two systems. The at least two systems may, for example, include a first scanning system connected to a first network, and a second scanning system connected to a second network. The source scanners may, for example, be connected to the first network. The source scanner may (optically) scan a physical object (e.g., a package label) and generate a first command signal corresponding to an attribute of the physical object (e.g., a barcode of a package). The first command signal may be transmitted via the first network (e.g., to an internal database and/or processing computer). In response to the first command signal, a display unit on the first network may generate a display corresponding to the attribute (e.g., create a display of a barcode).

The second scanning system may generate a second command signal in response to detecting the generated display. The second command signal may correspond to the attribute (e.g., the barcode). The second command signal may be transmitted via the second network (e.g., to a proprietary vendor database). Accordingly, a single scanning operation may advantageously be used to provide input to multiple master systems.

In some implementations, a queuing system may simultaneously receive multiple first command signals (e.g., from multiple source scanners) and generate corresponding displays sequentially (e.g., to a single second scanner system).

In an exemplary implementation, the source scanners may, for example, provide information to a first master system for customs import document (e.g., pediments). The source scanners may, for example, provide information to a second master system for shipper status information. Accordingly, with a single scanning operation, customs tracking may be updated, and shipper tracking may be updated on separate networks and/or physically isolated systems.

Some embodiments may, for example, provide a reconciliation system that 'squares' data between two systems. For example, if a number of packages physically scanned does not reconcile with shipper tracking systems (e.g., the second network), an interface may be generated to compare the source(s) to the physical scanning. Automatic reconciliation entries may be generated and stored based on a comparison of the actual scan data to the shipper system, for example. In some embodiments, by way of example and not limitation, reconciliation may occur after a physical package is scanned by a first scanner (e.g., a source scanner) and before corresponding codes are generated and displayed to at least one master scanner (e.g., a scanner connected to an origination facility). Accordingly, for example, discrepancies may be advantageously identified and rectified before data is scanned into a verification system.

Some embodiments may, for example, include a risk analysis method having natural language processing (NLP) of manifests and a machine learning model to identify package contents based on NLP of the manifests. NLP may be applied to the manifests to extract package attributes, which may include attributes of the contents of the package. The model may be applied to the extracted attributes, in combination with shipper information (e.g., permits) and destination information to determine whether a package meets destination jurisdiction requirements (e.g., import requirements). If the package is determined, within a predetermined criterion (e.g., confidence interval), to meet destination jurisdiction requirements, then the package may be accepted as being ('virtually') inspected and passing inspection. If the package is not determined to meet destination jurisdiction requirements within the predetermined criterion, then the package may be selected for further (e.g., manual, visual, imaging) inspection. If the package is determined to not meet the destination jurisdiction requirements within a (second) predetermined criterion, the package may be rejected as being inspected and failing. Accordingly, a number of packages to be physically opened may advantageously be drastically reduced.

Each scan of a package may, for example, induce generation of a visual display. For example, the visual display may display content attributes. The display may generate a visual indicia of inspection status (e.g., pass, inspect further, fail).

Results of further inspection may, for example, be recorded. The model may be updated based on the results of further inspection. Accordingly, the model may be dynamically updated to increase accuracy and/or capability (e.g., more products, more languages, more descriptors) of the model.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as a 9V (nominal) battery, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a computer program product (CPP) may include a program of instructions tangibly embodied on a non-transitory computer readable medium wherein, when the instructions are executed on a processor, the processor causes operations to be performed to automatically inspect contents of closed packages. The operations may include apply, in response to receiving a signal corresponding to text that indicates contents of a package, a natural language processing model to generate a content description profile, wherein the signal further indicates an originator of the package and a destination jurisdiction. The operations may include apply a content characterization model to the content description profile to generate a content attributes profile associating the contents of the package with at least one predetermined content attribute. The operations may include generate a jurisdiction entry compliance indicator (JECI) by a second set of operations. The second set of operations may include determine predetermined permissions rules as a function of the destination jurisdiction and the content attributes profile. The second set of operations may include determine predetermined permission attributes as a function of the originator of the package, the content attributes profile, and the predetermined permission attributes. The second set of operations may include apply the predetermined permissions rules to the predetermined permission attributes to generate the JECI that indicates a permissibility of the contents of the package to enter the destination jurisdiction. The second set of operations may include apply a predetermined confidence criterion to the JECI. The second set of operations may include, when the JECI meets the predetermined confidence criterion, then generate an indication to pass the package without manual inspection of the contents. The content characterization model may be dynamically trained based on historical content attributes associated with packages corresponding to a JECI that did not meet the predetermined confidence criterion.

Determine a predetermined permissions rules and determine predetermined permission attributes may include determining that the package qualifies for a simplified entry process.

The operations of the CPP may further include determine, based on the signal corresponding to text, whether the package corresponds to a simplified inspection process. The operations may include When the package does not correspond to the simplified inspection process, then determine at least one of the predetermined permission attributes to define a permit required by the destination jurisdiction as a function of the at least one predetermined content attribute.

The JECI may be determined to not meet the predetermined confidence criterion if any permit required is not associated with at least one corresponding predetermined permit record stored in a database in association with the originator of the package.

The operations of the CPP may further include, when the JECI is between the predetermined confidence criterion and a second predetermined confidence criterion, then generate an indication to manually inspect the package. The operations of the CPP may further include, when the JECI is below a second predetermined confidence criterion, then generate an indication to reject the package without manual inspection of the contents.

The operations of the CPP may further include, generate a human-readable display based on the indication to pass the package. The human-readable display may include a predetermined visual indicia prompting a user to pass the package.

Apply a content characterization model may include model training operations. The model training operations may include receive an initial content characterization model. The model training operations may include retrieve training data. The training data may include historic content description data and historic content attribute data associated with the historic content description data. The model training operations may include divide the training data into a training set and a test set. The model training operations may include train the initial content characterization model with the training data to generate a trained content characterization model. The model training operations may include apply the trained content characterization model to the historic content description data of the test set to generate predicted content attributes. The model training operations may include compare the predicted content attributes to the historic content attribute data of the test set. The model training operations may include, when the predicted content attributes are not within a predetermined matching criterion, then receive additional training data and repeat at least the steps of train, apply, and compare.

In an illustrative aspect, a computer-implemented method may be performed by at least one processor to automatically inspect contents of closed packages. The method may include apply, in response to receiving a signal corresponding to text that indicates contents of a package, a natural language processing model to generate a content description profile. The signal may further indicate an originator of the package and a destination jurisdiction. The method may include apply a content characterization model to the content description profile to generate a content attributes profile associating the contents of the package with at least one predetermined content attribute. The method may include generate a jurisdiction entry compliance indicator (JECI) by a second set of operations.

The second set of operations may include determine predetermined permissions rules as a function of the destination jurisdiction and the content attributes profile. The second set of operations may include determine predetermined permission attributes as a function of the originator of the package, the content attributes profile, and the predetermined permissions rules. The second set of operations may include apply the predetermined permissions rules to the predetermined permission attributes to generate the JECI that indicates a permissibility of the contents of the package to enter the destination jurisdiction. The second set of operations may include apply a predetermined confidence criterion to the JECI. The second set of operations may include, when the JECI meets the predetermined confidence criterion, then generate an indication to pass the package without manual inspection of the contents.

Determine a predetermined permissions rules and determine predetermined permission attributes may include determining that the package qualifies for a simplified entry process.

The method may include determine, based on the signal corresponding to text, whether the package corresponds to a simplified inspection process. The method may include, when the package does not correspond to the simplified inspection process, then determine at least one of the predetermined permission attributes to define a permit required by the destination jurisdiction as a function of the at least one predetermined content attribute.

The JECI may be determined to not meet the predetermined confidence criterion if any permit required is not associated with at least one corresponding predetermined permit record stored in a database in association with the originator of the package.

The content characterization model may be dynamically trained based on historical content attributes associated with packages corresponding to a JECI that did not meet the predetermined confidence criterion.

The method may include, when the JECI is between the predetermined confidence criterion and a second predetermined confidence criterion, then generate an indication to manually inspect the package. The method may include, when the JECI is below a second predetermined confidence criterion, then generate an indication to reject the package without manual inspection of the contents.

Apply a content characterization model may include model training operations. The model training operations may include receive an initial content characterization model. The model training operations may include retrieve training data. The training data may include historic content description data and historic content attribute data associated with the historic content description data. The model training operations may include divide the training data into a training set and a test set. The model training operations may include train the initial content characterization model with the training data to generate a trained content characterization model. The model training operations may include apply the trained content characterization model to the historic content description data of the test set to generate predicted content attributes. The model training operations may include compare the predicted content attributes to the historic content attribute data of the test set. The model training operations may include, when the predicted content attributes are not within a predetermined matching criterion, then receive additional training data and repeat at least the steps of train, apply, and compare.

The method may include generate a human-readable display based on the indication to pass the package. The human-readable display may include a predetermined visual indicia prompting a user to pass the package. The predetermined visual indicia may include a region of a predetermined color corresponding to the indication to pass the package.

In an illustrative aspect, a system may include a non-transitory data store including a program of instructions; and, a processor operably coupled to the data store such that, when the processor executes the program of instructions, the processor causes operations to be performed to automatically inspect contents of closed packages. The operations may include apply, in response to receiving a signal corresponding to text that indicates contents of a package, a natural language processing model to generate a content description profile. The signal may further indicate an originator of the package and a destination jurisdiction. The operations may include apply a content characterization model to the content description profile to generate a content attributes profile associating the contents of the package with at least one predetermined content attribute. The operations may include generate a jurisdiction entry compliance indicator (JECI) by a second set of operations.

The second set of operations may include determine predetermined permissions rules as a function of the destination jurisdiction and the content attributes profile. The second set of operations may include determine predetermined permission attributes as a function of the originator of the package, the content attributes profile, and the predetermined permission attributes. The second set of operations may include apply the predetermined permissions rules to the predetermined permission attributes to generate the JECI that indicates a permissibility of the contents of the package to enter the destination jurisdiction. The second set of operations may include apply a predetermined confidence criterion to the JECI. The second set of operations may include, when the JECI meets the predetermined confidence criterion, then generate an indication to pass the package without manual inspection of the contents.

The content characterization model may be dynamically trained based on historical content attributes associated with packages corresponding to a JECI that did not meet the predetermined confidence criterion.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A computer program product comprising:
  a program of instructions tangibly embodied on a non-transitory computer readable medium wherein, when the instructions are executed on a processor, the processor causes operations to be performed to automatically inspect contents of closed packages, the operations comprising:
    apply, in response to receiving a signal from a customs broker package inspection station corresponding to text that indicates contents of a closed package, the text being external to the package, a natural language processing model to generate a content description profile, wherein the signal further indicates an originator of the package and a destination jurisdiction;
    perform model training operations comprising;
      train a content characterization model with training data to generate a trained content characterization model, the training data comprising predetermined content description data and content attribute data associated with the predetermined content description data;
      apply the trained content characterization model to testing data to generate a training metric as a function of a comparison between predicted content attributes and model content attributes associated with the testing data; and, when the training score does not meet a predetermined criterion, then repeat at least the steps of train and apply;

apply the content characterization model to the content description profile to generate a content attributes profile associating the contents of the package with at least one predetermined content attribute; and, generate a jurisdiction entry compliance indicator (JECI) as a function of the destination jurisdiction, the content attributes profile, permission attributes, and permission rules such that the JECI indicates a permissibility of the contents of the package to enter the destination jurisdiction;

when the JECI meets at least one predetermined confidence criterion, then automatically generate and transmit an indication to customs broker personnel operating the inspection station not to open the package and perform manual inspection of the contents, wherein the at least one predetermined confidence criterion corresponds to accuracy of the content attribute characterizing the contents of the closed package and to conformance of the contents of the closed package to the predetermined permissions rules and the predetermined permissions attributes.

2. The computer-implemented method of claim 1, wherein the operations further comprise:
select the predetermined permissions rules and assign the predetermined permission attributes comprising:
determining that the package qualifies for a simplified entry process.

3. The computer program product of claim 1, further comprising:
determine, based on the signal corresponding to text, whether the package corresponds to a simplified inspection process; and,
when the package does not correspond to the simplified inspection process, then assign at least one of the predetermined permission attributes to define a permit required by the destination jurisdiction as a function of the at least one predetermined content attribute.

4. The computer program product of claim 3, wherein:
the JECI is determined to not meet the at least one predetermined confidence criterion if any permit required is not associated with at least one corresponding predetermined permit record stored in a database in association with the originator of the package.

5. The computer program product of claim 1, further comprising:
when the JECI is between the at least one predetermined confidence criterion and a second predetermined confidence criterion, then generate an indication to manually inspect the package.

6. The computer program product of claim 1, further comprising:
when the JECI is below a second predetermined confidence criterion, then generate an indication to reject the package without manual inspection of the contents.

7. The computer program product of claim 1, further comprising:
generate a human-readable display based on the indication to pass the package, wherein the human-readable display comprises a predetermined visual indicia prompting a user to pass the package.

8. The computer program product of claim 1, further comprising perform model training operations, the model training operations comprising:
receive an initial content characterization model;
retrieve training data comprising historic content description data and historic content attribute data associated with the historic content description data;
divide the training data into a training set and a test set;
train the initial content characterization model with the training data to generate a trained content characterization model;
apply the trained content characterization model to the historic content description data of the test set to generate predicted content attributes;
compare the predicted content attributes to the historic content attribute data of the test set; and,
when the predicted content attributes are not within a predetermined matching criterion, then receive additional training data and repeat at least the steps of train, apply, and compare.

9. A computer-implemented method performed by at least one processor to automatically inspect contents of closed packages, the method comprising:
apply, in response to receiving a signal from a customs broker package inspection station corresponding to text that indicates contents of a closed package, the text being external to the package, a natural language processing model to generate a content description profile, wherein the signal further indicates an originator of the package and a destination jurisdiction;
perform model training operations comprising;
train an initial content characterization model with training data to generate a trained content characterization model, the training data comprising predetermined content description data and content attribute data associated with the predetermined content description data;
apply the trained content characterization model to testing data to generate a training metric as a function of a comparison between predicted content attributes and model content attributes associated with the testing data; and,
when the training score does not meet a predetermined criterion, then repeat at least the steps of train and apply;
apply the content characterization model to the content description profile to generate a content attributes profile associating the contents of the package with at least one predetermined content attribute; and,
generate a jurisdiction entry compliance indicator (JECI) as a function of the destination jurisdiction, the content attributes profile, permission attributes, and permission rules such that the JECI indicates a permissibility of the contents of the package to enter the destination jurisdiction;
when the JECI meets at least one predetermined confidence criterion, then automatically generate and transmit an indication to a customs broker personnel operating the inspection station not to open the package and perform-manual inspection of the contents,
wherein the at least one predetermined confidence criterion corresponds to an accuracy of the content attribute characterizing the contents of the closed package and a conformance of the contents of the closed package to the predetermined permissions rules and the predetermined permissions attributes.

10. The computer-implemented method of claim 9, wherein the operations further comprise:
  select the predetermined permissions rules and assign the predetermined permission attributes comprising:
    determining that the package qualifies for a simplified entry process.

11. The computer-implemented method of claim 9, further comprising:
  determine, based on the signal corresponding to text, whether the package corresponds to a simplified inspection process; and,
  when the package does not correspond to the simplified inspection process, then assign at least one of the predetermined permission attributes to define a permit required by the destination jurisdiction as a function of the at least one predetermined content attribute.

12. The computer-implemented method of claim 11, wherein:
  the JECI is determined to not meet the at least one predetermined confidence criterion if any permit required is not associated with at least one corresponding predetermined permit record stored in a database in association with the originator of the package.

13. The computer-implemented method of claim 9, wherein the content characterization model is dynamically trained based on historical content attributes associated with packages corresponding to a JECI that did not meet the at least one predetermined confidence criterion.

14. The computer-implemented method of claim 9, further comprising:
  when the JECI is between the at least one predetermined confidence criterion and a second predetermined confidence criterion, then generate an indication to manually inspect the package.

15. The computer-implemented method of claim 9, further comprising:
  when the JECI is below a second predetermined confidence criterion, then generate an indication to reject the package without manual inspection of the contents.

16. The computer-implemented method of claim 9, wherein the model training operations comprise:
  receive an initial content characterization model;
  retrieve the training data comprising historic content description data and historic content attribute data associated with the historic content description data;
  divide the training data into a training set and a test set;
  train the initial content characterization model with the training data to generate a trained content characterization model;
  apply the trained content characterization model to the historic content description data of the test set to generate predicted content attributes;
  compare the predicted content attributes to the historic content attribute data of the test set; and,
  when the predicted content attributes are not within a predetermined matching criterion, then receive additional training data and repeat at least the steps of train, apply, and compare,
  wherein the predetermined training criterion comprises the predetermined matching criterion.

17. The computer-implemented method of claim 9, further comprising:
  generate a human-readable display based on the indication to pass the package, wherein the human-readable display comprises a predetermined visual indicia prompting a user to pass the package.

18. The computer-implemented method of claim 17, wherein the predetermined visual indicia comprises a region of a predetermined color corresponding to the indication to pass the package.

19. A system comprising:
  a non-transitory data store comprising a program of instructions; and,
  a processor operably coupled to the data store such that, when the processor executes the program of instructions, the processor causes operations to be performed to automatically inspect contents of closed packages, the operations comprising:
    apply, in response to receiving a signal from a customs broker package inspection station corresponding to text external to the package that indicates contents of a closed package, a natural language processing model to generate a content description profile, wherein the signal further indicates an originator of the package and a destination jurisdiction;
    perform model training operations comprising;
      train an initial content characterization model with training data to generate a trained content characterization model, the training data comprising predetermined content description data and content attribute data associated with the predetermined content description data;
      apply the trained content characterization model to testing data to generate a training metric as a function of a comparison between predicted content attributes and model content attributes associated with the testing data; and,
      when the training score does not meet a predetermined criterion, then repeat at least the steps of train and apply;
    apply the content characterization model to the content description profile to generate a content attributes profile associating the contents of the package with at least one predetermined content attribute; and,
    generate a jurisdiction entry compliance indicator (JECI) as a function of the destination jurisdiction, the content attributes profile, permission attributes, and permission rules such that the JECI indicates a permissibility of the contents of the package to enter the destination jurisdiction;
      when the JECI meets at least one predetermined confidence criterion, then automatically generate and transmit an indication to a customs broker personnel operating the inspection station not to open the package and perform manual inspection of the contents;
    wherein the at least one predetermined confidence criterion corresponds to an accuracy of the content attribute characterizing the contents of the closed package and a conformance of the contents of the closed package to the predetermined permissions rules and the predetermined permissions attributes.

20. The system of claim 19, wherein the content characterization model is dynamically trained based on historical content attributes associated with packages corresponding to a JECI that did not meet the at least one predetermined confidence criterion.

21. The computer program product of claim 1, further comprising a second set of operations comprising:
  select predetermined permissions rules as a function of the destination jurisdiction and the content attributes profile;

assign predetermined permission attributes as a function of the originator of the package and the content attributes profile;

apply the predetermined permissions rules to the predetermined permission attributes to generate such that the JECI that indicates a permissibility of the contents of the package to enter the destination jurisdiction; and apply at least one predetermined confidence criterion to the JECI.

22. The Computer program product of claim 1, further comprising:

dynamically training the content characterization model based on historical content attributes associated with packages corresponding to a JECI that did not meet the at least one predetermined confidence criterion, the training comprising:

train an initial content characterization model with training data to generate a trained content characterization model, the training data comprising predetermined content description data and content attribute data associated with the predetermined content description data;

apply the trained content characterization model to testing data to generate a training metric as a function of a comparison between predicted content attributes and model content attributes associated with the testing data; and, when the training metric does not meet a predetermined training criterion, then repeat at least the steps of train and apply.

23. The computer implemented method of claim 9, further comprising a second set of operations comprising:

select predetermined permissions rules as a function of the destination jurisdiction and the content attributes profile;

assign predetermined permission attributes as a function of the originator of the package and the content attributes profile;

apply the predetermined permissions rules to the predetermined permission attributes to generate such that the JECI that indicates a permissibility of the contents of the package to enter the destination jurisdiction; and apply at least one predetermined confidence criterion to the JECI.

24. The computer implemented method of claim 9, further including dynamically training the content characterization model based on historical content attributes associated with packages corresponding to a JECI that did not meet the at least one predetermined confidence criterion, the training comprising:

train an initial content characterization model with training data to generate a trained content characterization model, the training data comprising predetermined content description data and content attribute data associated with the predetermined content description data;

apply the trained content characterization model to testing data to generate a training metric as a function of a comparison between predicted content attributes and model content attributes associated with the testing data; and, when the training metric does not meet a predetermined training criterion, then repeat at least the steps of train and apply.

25. The system of claim 19, further comprising a second set of operations comprising:

select predetermined permissions rules as a function of the destination jurisdiction and the content attributes profile;

assign predetermined permission attributes as a function of the originator of the package and the content attributes profile;

apply the predetermined permissions rules to the predetermined permission attributes to generate such that the JECI that indicates a permissibility of the contents of the package to enter the destination jurisdiction; and apply at least one predetermined confidence criterion to the JECI.

26. The system of claim 19, further including dynamically training the content characterization model based on historical content attributes associated with packages corresponding to a JECI that did not meet the at least one predetermined confidence criterion, the training comprising:

train an initial content characterization model with training data to generate a trained content characterization model, the training data comprising predetermined content description data and content attribute data associated with the predetermined content description data;

apply the trained content characterization model to testing data to generate a training metric as a function of a comparison between predicted content attributes and model content attributes associated with the testing data; and, when the training metric does not meet a predetermined training criterion, then repeat at least the steps of train and apply.

* * * * *